United States Patent
Tsunoda et al.

(10) Patent No.: US 10,442,163 B2
(45) Date of Patent: Oct. 15, 2019

(54) MULTILAYER INTERLAYER FILM HAVING INFRARED RAY REFLECTION LAYER AND THERMOPLASTIC RESIN, AND LAMINATED GLASS HAVING SUCH FILM

(71) Applicant: SEKISUI CHEMICAL CO., LTD., Osaka, Osaka (JP)

(72) Inventors: Ryuta Tsunoda, Kouka (JP); Yasuyuki Izu, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 243 days.

(21) Appl. No.: 14/898,107

(22) PCT Filed: Jun. 13, 2014

(86) PCT No.: PCT/JP2014/065812
§ 371 (c)(1),
(2) Date: Dec. 11, 2015

(87) PCT Pub. No.: WO2014/200108
PCT Pub. Date: Dec. 18, 2014

(65) Prior Publication Data
US 2016/0154153 A1    Jun. 2, 2016

(30) Foreign Application Priority Data

Jun. 14, 2013  (JP) ................................ 2013-125728
Jan. 29, 2014  (JP) ................................ 2014-014942
Jan. 29, 2014  (JP) ................................ 2014-014943

(51) Int. Cl.
*B32B 17/10*       (2006.01)
*C08J 5/18*        (2006.01)
(Continued)

(52) U.S. Cl.
CPC .. *B32B 17/10761* (2013.01); *B32B 17/10036* (2013.01); *B32B 17/10339* (2013.01);
(Continued)

(58) Field of Classification Search
CPC ........ B32B 17/10036; B32B 17/10339; B32B 17/10651; B32B 17/10761; B32B 27/08;
(Continued)

(56) References Cited

U.S. PATENT DOCUMENTS

2004/0234778 A1   11/2004  Fukatani et al.
2006/0050425 A1    5/2006  Muromachi et al.
(Continued)

FOREIGN PATENT DOCUMENTS

CN        102625786 A    8/2012
EP        2 471 761 A1   7/2012
(Continued)

OTHER PUBLICATIONS

Supplementary European Search Report for the Application No. EP 14 81 1566 dated Dec. 23, 2016.
(Continued)

*Primary Examiner* — Stephone B Allen
*Assistant Examiner* — Ryan S Dunning
(74) *Attorney, Agent, or Firm* — Cheng Law Group, PLLC

(57) ABSTRACT

There is provided an interlayer film for laminated glass with which the visible light transmittance and the heat resistance of the laminated glass can be heightened. The interlayer film for laminated glass according to the present invention includes an organic coloring matter containing a transition element, a metal element which is different from a metal element contained in a metal oxide particle and different from a transition element, a thermoplastic resin and a plasticizer.

17 Claims, 2 Drawing Sheets

(51) Int. Cl.

| | | |
|---|---|---|
| *C08K 13/02* | (2006.01) | |
| *G02B 5/20* | (2006.01) | |
| *B32B 27/08* | (2006.01) | |
| *C03C 27/06* | (2006.01) | |
| *C08K 5/098* | (2006.01) | |
| *C08K 5/103* | (2006.01) | |
| *C08K 5/3465* | (2006.01) | |
| *C08K 5/56* | (2006.01) | |
| *G02B 1/116* | (2015.01) | |

(52) U.S. Cl.
CPC ........ *B32B 17/10651* (2013.01); *B32B 27/08* (2013.01); *C03C 27/06* (2013.01); *C08J 5/18* (2013.01); *C08K 5/098* (2013.01); *C08K 5/103* (2013.01); *C08K 5/3465* (2013.01); *C08K 5/56* (2013.01); *C08K 13/02* (2013.01); *G02B 5/208* (2013.01); *B32B 2307/408* (2013.01); *B32B 2307/4026* (2013.01); *B32B 2307/412* (2013.01); *B32B 2307/558* (2013.01); *B32B 2419/00* (2013.01); *B32B 2605/00* (2013.01); *B32B 2605/006* (2013.01); *B32B 2605/08* (2013.01); *C08J 2329/14* (2013.01); *G02B 1/116* (2013.01)

(58) Field of Classification Search
CPC ...... B32B 2307/4026; B32B 2307/408; B32B 2307/412; B32B 2307/558; B32B 2419/00; B32B 2605/00; B32B 2605/006; B32B 2605/08; C03C 27/06; C08J 5/18; C08J 2329/14; C08K 5/098; C08K 5/103; C08K 5/3465; C08K 5/56; C08K 13/02; G02B 1/11; G02B 1/115; G02B 1/116; G02B 5/206; G02B 5/208
USPC ....... 359/350, 359, 360, 361, 577, 580, 584, 359/585, 589, 590, 601, 614; 428/432; 524/88

See application file for complete search history.

(56) References Cited

U.S. PATENT DOCUMENTS

| | | |
|---|---|---|
| 2009/0035583 A1 | 2/2009 | Fisher |
| 2012/0162752 A1 | 6/2012 | Kitano et al. |
| 2013/0143049 A1 | 6/2013 | Kitano et al. |
| 2013/0323517 A1 | 12/2013 | Kitano et al. |
| 2014/0193646 A1 | 7/2014 | Kitano et al. |
| 2014/0377567 A1 | 12/2014 | Ii et al. |
| 2015/0346404 A1* | 12/2015 | Bak .................. H01L 27/14618 348/342 |

FOREIGN PATENT DOCUMENTS

| | | |
|---|---|---|
| EP | 2 471 762 A1 | 7/2012 |
| EP | 2 610 226 A1 | 7/2013 |
| EP | 2 679 557 A1 | 1/2014 |
| EP | 2 813 478 A1 | 12/2014 |
| JP | 6-191906 A | 7/1994 |
| JP | 6-293539 A | 10/1994 |
| JP | 2004-26547 A | 1/2004 |
| JP | 2010-138028 A | 6/2010 |
| JP | 2010-265160 A | 11/2010 |
| WO | WO-03/018502 A1 | 3/2003 |
| WO | WO-2010/119771 A1 | 10/2010 |
| WO | WO-2012/026487 A1 | 3/2012 |
| WO | WO-2012/115197 A1 | 8/2012 |
| WO | WO-2013/118890 A1 | 8/2013 |

OTHER PUBLICATIONS

Supplementary European Search Report for the Application No. EP 14 81 0912 dated Jan. 2, 2017.
Written Opinion of the International Searching Authority (PCT/ISA/237) for Application No. PCT/JP2014/065812 dated Sep. 16, 2014 (English Translation mailed Dec. 23, 2015).
International Search Report for the Application No. PCT/JP2014/065812 dated Sep. 16, 2014.
Written Opinion of the international Searching Authority (PCT/ISA/237) for Application No. PCT/JP2014/065812 dated Sep. 16, 2014.
International Search Report for the Application No. PCT/JP2014/065611 dated Sep. 16, 2014.
Written Opinion of the International Searching Authority (PCT/ISA/237)for Application No. PCT/JP2014/065811 dated Sep. 16, 2014.
The First Office Action for the Application No. 201480033768.7 from The State Intellectual Property Office of the People's Republic of China dated Jul. 21, 2017.
Non-Final Office Action for the U.S. Appl. No. 14/898,119 from the United States and Trademark Office dated Nov. 22, 2017.
European Office Action for Application No. EP 14 811 566.0 dated Mar. 28, 2018.
European Office Action for Application No. EP 14 810 912.7 dated Mar. 28, 2018.
Final Office Action for the U.S. Appl. No. 14/898,119 from the United States Patent and Trademark Office dated May 9, 2018.
Notification of Reasons for Refusal for the Application No. 2014-530983 from Japan Patent Office dated Jun. 26, 2018.
European Office Action for the Application No. 14 810 912.7 dated Jan. 30, 2019.

\* cited by examiner

[FIG. 1]
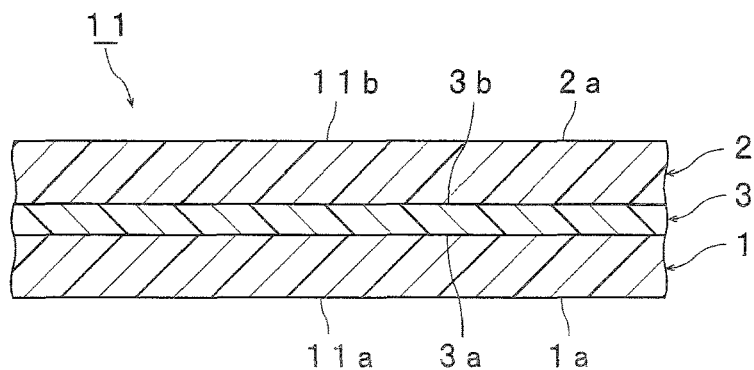
[FIG. 2]
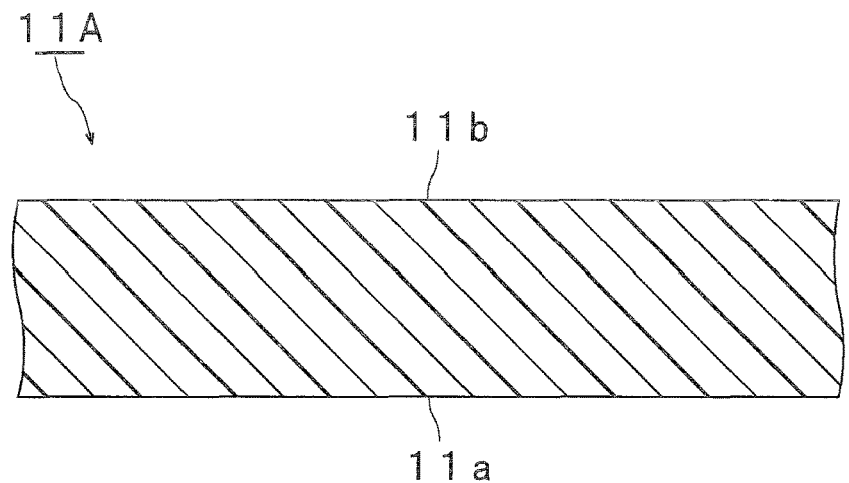
[FIG. 3]
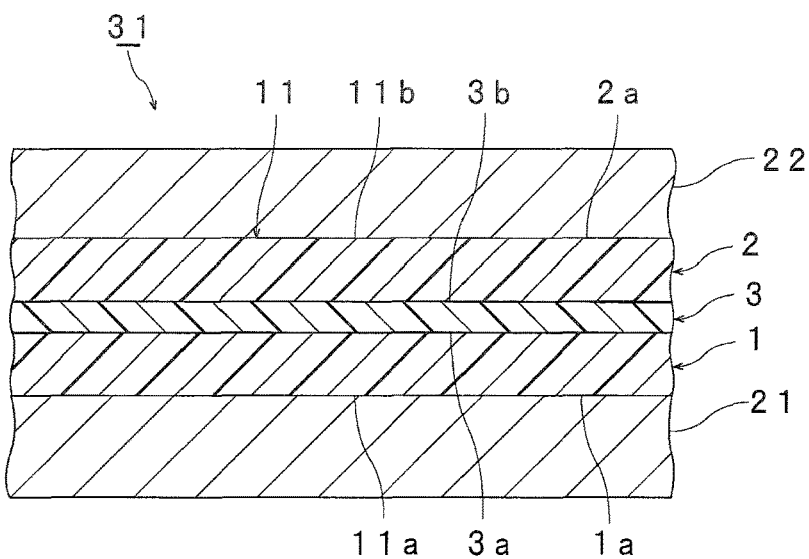

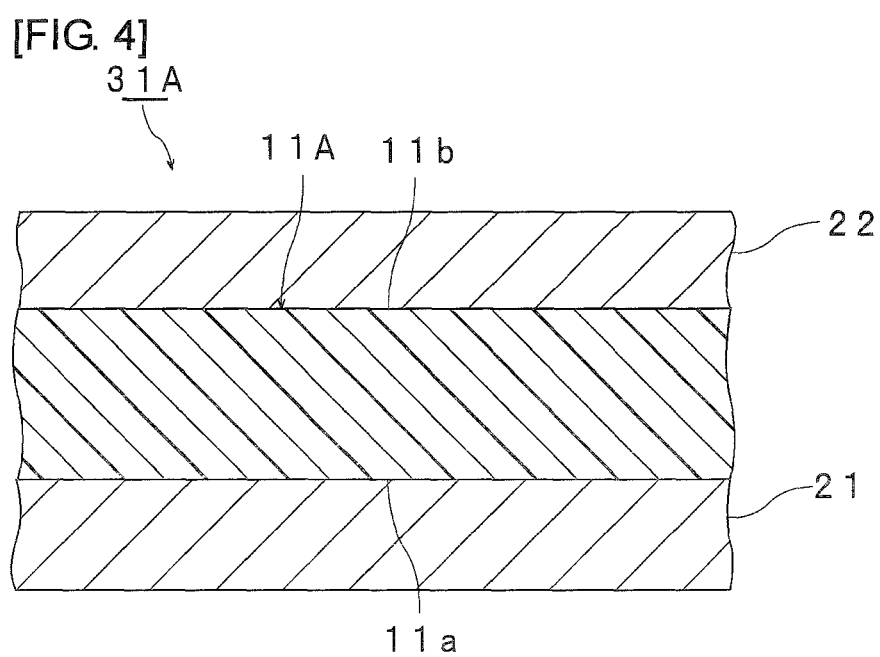

MULTILAYER INTERLAYER FILM HAVING INFRARED RAY REFLECTION LAYER AND THERMOPLASTIC RESIN, AND LAMINATED GLASS HAVING SUCH FILM

TECHNICAL FIELD

The present invention relates to an interlayer film for laminated glass and a multilayer interlayer film for laminated glass which are used for obtaining laminated glass. Moreover, the present invention relates to laminated glass prepared with the interlayer film for laminated glass or the multilayer interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. For example, the laminated glass is produced by sandwiching an intermediate film for laminated glass between a pair of glass plates.

The following Patent Document 1 discloses an interlayer film for laminated glass containing a tetraazaporphyrin compound.

The following Patent Document 2 discloses an interlayer film obtained by using a plasticized polyvinyl acetal resin composition. The plasticized polyvinyl acetal resin composition contains 100 parts by weight of a polyvinyl acetal resin, 20 to 60 parts by weight of a plasticizer, 0.1 to 3 parts by weight of at least one kind of fine particles selected from the group consisting of tin-doped indium oxide (ITO) fine particles, antimony-doped tin oxide (ATO) fine particles, aluminum-doped zinc oxide (AZO) fine particles, indium-doped zinc oxide (IZO) fine particles, tin-doped zinc oxide fine particles, silicon-doped zinc oxide fine particles, lanthanum hexaboride fine particles and cerium hexaboride fine particles, and 0.00001 to 5 parts by weight of at least one kind of a compound selected from the group consisting of a diimonium-based coloring matter, an aminium-based coloring matter, a phthalocyanine-based coloring matter, an anthraquinone-based coloring matter, a polymethine-based coloring matter, a benzenedithiol type ammonium-based compound, a thiourea derivative and a thiol metal complex.

The following Patent Document 3 discloses an interlayer film which is high in ultraviolet ray blocking characteristics and capable of maintaining the optical quality over a long period of time. This interlayer film contains a polymer layer. The polymer layer contains a tungsten oxide reagent and at least one kind among a molecule having a benzotriazole group and a polyvalent metal salt.

RELATED ART DOCUMENT

Patent Document

Patent Document 1: JP 2010-138028 A
Patent Document 2: WO 03/018502 A1
Patent Document 3: US 2009/0035583 A1

SUMMARY OF THE INVENTION

Problems to be Solved by the Invention

In laminated glass prepared with such a conventional interlayer film described in Patent Documents 1 to 3, there are cases where it is difficult to sufficiently heighten the visible light transmittance of the laminated glass. Furthermore, there are cases where the heat resistance of the laminated glass is lowered. Moreover, in laminated glass prepared with the conventional interlayer film, it is difficult to sufficiently lower the visible light transmittance, sufficiently heighten the heat resistance and also heighten the heat shielding properties.

An object of the present invention is to provide an interlayer film for laminated glass and a multilayer interlayer film for laminated glass with which the visible light transmittance and the heat resistance of the laminated glass can be heightened. Moreover, an object of the present invention with limitation is to provide an interlayer film for laminated glass and a multilayer interlayer film for laminated glass with which the heat shielding properties can be heightened, as well as the visible light transmittance and the heat resistance can be heightened. Moreover, the present invention is also aimed at providing laminated glass prepared with the interlayer film for laminated glass or the multilayer interlayer film for laminated glass.

Means for Solving the Problems

According to a broad aspect of the present invention, there is provided an interlayer film for laminated glass including an organic coloring matter containing a transition element, a metal element different from a transition element, a thermoplastic resin and a plasticizer.

In a specific aspect of the interlayer film for laminated glass according to the present invention, the metal element is a polyvalent metal element.

In a specific aspect of the interlayer film for laminated glass according to the present invention, the content of the metal element is greater than or equal to 20 ppm and less than or equal to 200 ppm.

In a specific aspect of the interlayer film for laminated glass according to the present invention, the metal element different from the transition element is magnesium, and the metal element different from the transition element is added as magnesium acetate or magnesium 2-ethylbutyrate to be contained.

In a specific aspect of the interlayer film for laminated glass according to the present invention, the transition element in the organic coloring matter containing a transition element is copper or vanadium, and the organic coloring matter containing a transition element is a phthalocyanine compound or a naphthalocyanine compound.

In a specific aspect of the interlayer film for laminated glass according to the present invention, the maximum absorption wavelength of the organic coloring matter containing a transition element is greater than or equal to 550 nm and less than or equal to 750 nm.

In a specific aspect of the interlayer film for laminated glass according to the present invention, the interlayer film further includes metal oxide particles.

In a specific aspect of the interlayer film for laminated glass according to the present invention, the metal oxide particles are tin-doped indium oxide particles or tungsten oxide particles.

In a specific aspect of the interlayer film for laminated glass according to the present invention, the thermoplastic resin is a polyvinyl acetal resin.

According to a broad aspect of the present invention, there is provided a multilayer interlayer film for laminated glass including an infrared ray reflection layer reflecting infrared rays and a first resin layer containing a thermoplastic resin, wherein the first resin layer is arranged on a first surface side of the infrared ray reflection layer, and the first resin layer is the above-described interlayer film for laminated glass.

In a specific aspect of the multilayer interlayer film for laminated glass according to the present invention, the multilayer interlayer film includes the infrared ray reflection layer reflecting infrared rays, the first resin layer containing a thermoplastic resin and a second resin layer containing a thermoplastic resin, wherein the first resin layer is arranged on the first surface side of the infrared ray reflection layer, the second resin layer is arranged on a second surface side opposite to the first surface of the infrared ray reflection layer, and at least the first resin layer among the first resin layer and the second resin layer is the above-described interlayer film for laminated glass.

The infrared ray reflection layer has a characteristic having the infrared ray transmittance of 50% or less at one or more wavelength within the range of 780 to 2100 nm.

In a specific aspect of the multilayer interlayer film for laminated glass according to the present invention, the infrared ray reflection layer is a resin film with metal foil, a multilayer laminated film in which a metal layer and a dielectric layer are formed on a resin layer, a multilayer resin film or a liquid crystal film.

In a specific aspect of the multilayer interlayer film for laminated glass according to the present invention, the infrared ray transmittance in the wavelength range of 780 to 2100 nm of the first resin layer is higher than the infrared ray transmittance in the wavelength range of 780 to 2100 nm of the second resin layer.

In a specific aspect of the multilayer interlayer film for laminated glass according to the present invention, the thermoplastic resin contained in the first resin layer is a polyvinyl acetal resin, and in the specific aspect thereof, the thermoplastic resin contained in the second resin layer is a polyvinyl acetal resin.

In a specific aspect of the multilayer interlayer film for laminated glass according to the present invention, the first resin layer contains a plasticizer, and in the specific aspect thereof, the second resin layer contains a plasticizer.

In a specific aspect of the multilayer interlayer film for laminated glass according to the present invention, the first resin layer contains an ultraviolet ray shielding agent, and in the specific aspect thereof, the second resin layer contains an ultraviolet ray shielding agent.

According to a broad aspect of the present invention, there is provided laminated glass including a first laminated glass member, a second laminated glass member and the above-described interlayer film for laminated glass or the above-described multilayer interlayer film for laminated glass, wherein the interlayer film for laminated glass or the multilayer interlayer film for laminated glass is arranged between the first laminated glass member and the second laminated glass member.

Effect of the Invention

Since the interlayer film for laminated glass according to the present invention includes an organic coloring matter containing a transition element, a metal element different from a transition element, a thermoplastic resin and a plasticizer, the visible light transmittance and the heat resistance of laminated glass prepared with the interlayer film for laminated glass according to the present invention can be heightened.

BRIEF DESCRIPTION OF DRAWINGS

FIG. 1 is a cross-sectional view schematically showing a multilayer interlayer film for laminated glass in accordance with one embodiment of the present invention.

FIG. 2 is a cross-sectional view schematically showing an interlayer film for laminated glass in accordance with one embodiment of the present invention.

FIG. 3 is a cross-sectional view schematically showing an example of laminated glass prepared with the multilayer interlayer film for laminated glass shown in FIG. 1.

FIG. 4 is a cross-sectional view schematically showing an example of laminated glass prepared with the interlayer film for laminated glass shown in FIG. 2.

MODE FOR CARRYING OUT THE INVENTION

Hereinafter, the details of the present invention will be described.

The interlayer film for laminated glass (hereinafter, sometimes abbreviated as the interlayer film) according to the present invention includes an organic coloring matter containing a transition element (hereinafter, sometimes described as an organic coloring matter X), a metal element different from a transition element (hereinafter, sometimes described as a metal element Y), a thermoplastic resin and a plasticizer. The interlayer film according to the present invention does not include or includes metal oxide particles.

Since the interlayer film for laminated glass according to the present invention includes the above-described configuration, in laminated glass prepared with the interlayer film for laminated glass according to the present invention, it is possible 1) to heighten the visible light transmittance (Visible Transmittance) and furthermore, 2) to heighten the heat resistance.

Furthermore, in laminated glass prepared with the interlayer film according to the present invention, it is possible not only 1) to heighten the visible light transmittance and 2) to heighten the heat resistance but also 3) to heighten the heat shielding properties. In particular, in the case where the interlayer film according to the present invention includes heat shielding particles such as metal oxide particles, in the laminated glass, it is possible 3) to further heighten the heat shielding properties. In the case where the interlayer film according to the present invention is used in a multilayer interlayer film described below, in laminated glass prepared with the resulting multilayer interlayer film, it is possible 3) to further heighten the heat shielding properties.

By allowing the interlayer film according to the present invention to include the above-described configuration, in laminated glass prepared with the interlayer film according to the present invention, any of effects of the above-mentioned 1), the above-mentioned 2) and the above-mentioned 3) can be enhanced. It has hitherto been difficult to allow the effects of all of the above-mentioned 1), the above-mentioned 2) and the above-mentioned 3) to be exerted in an interlayer film. In contrast, the present inventors have found a configuration enabling the effects of all of the above-mentioned 1), the above-mentioned 2) and the above-mentioned 3) to be exerted. In the present invention, it is possible to obtain the effects of 1) high visible light transmittance, 2) high heat resistance and 3) high heat shielding properties, the combination of which has hitherto been difficult to be obtained, in combination.

The multilayer interlayer film for laminated glass (hereinafter, sometimes abbreviated as the multilayer interlayer film) according to the present invention is provided with an infrared ray reflection layer reflecting infrared rays and a first resin layer containing a thermoplastic resin. The multilayer interlayer film for laminated glass according to the present invention is preferably provided with an infrared ray reflection layer reflecting infrared rays, a first resin layer containing a thermoplastic resin and a second resin layer containing a thermoplastic resin. In the multilayer interlayer film according to the present invention, the first resin layer is arranged on a first surface side of the infrared ray reflection layer. In the case where the multilayer interlayer film according to the present invention is provided with the second resin layer, the second resin layer is arranged on a second surface side opposite to the first surface of the infrared ray reflection layer. In the case where the multilayer interlayer film according to the present invention is not provided with the second resin layer, the first resin layer constitutes the interlayer film according to the present invention, and thus, the first resin layer contains an organic coloring matter X, a metal element Y, a thermoplastic resin and a plasticizer. In the case where the multilayer interlayer film according to the present invention is provided with the second resin layer, at least the first resin layer among the first resin layer and the second resin layer constitutes the interlayer film according to the present invention. In the multilayer interlayer film according to the present invention, only the first resin layer may constitute the interlayer film according to the present invention, and thus, only the first resin layer may contain an organic coloring matter X, a metal element Y, a thermoplastic resin and a plasticizer. Both of the first resin layer and the second resin layer may constitute the interlayer film according to the present invention, and thus, both of the first resin layer and the second resin layer may contain an organic coloring matter X, a metal element Y, a thermoplastic resin and a plasticizer.

The multilayer interlayer film according to the present invention enables the effects of all of the above-mentioned 1), the above-mentioned 2) and the above-mentioned 3) to be exerted at a higher level.

Hereinafter, specific embodiments of the present invention will be described with reference to the drawings.

FIG. 1 is a cross-sectional view schematically showing a multilayer interlayer film for laminated glass in accordance with one embodiment of the present invention.

The multilayer interlayer film 11 shown in FIG. 1 is a multilayer interlayer film having a two or more-layered structure. The multilayer interlayer film 11 is used to obtain laminated glass. The multilayer interlayer film 11 is a multilayer interlayer film for laminated glass. The multilayer interlayer film 11 is provided with a first resin layer 1, a second resin layer 2 and an infrared ray reflection layer 3. The first layer 1 is arranged on a first surface 3a of the infrared ray reflection layer 3 to be layered thereon. The second resin layer 2 is arranged on a second surface 3b opposite to the first surface 3a of the infrared ray reflection layer 3 to be layered thereon. The infrared ray reflection layer 3 is an intermediate layer. Each of the first resin layer 1 and the second resin layer 2 is a protective layer and is a surface layer in the present embodiment. The infrared ray reflection layer 3 is arranged between the first resin layer 1 and the second resin layer 2 to be sandwiched therebetween. Accordingly, the multilayer interlayer film 11 has a multilayer structure (the first resin layer 1/the infrared ray reflection layer 3/the second resin layer 2) in which the first resin layer 1, the infrared ray reflection layer 3 and the second resin layer 2 are layered in this order.

In the multilayer interlayer film 11, at least the first resin layer 1 among the first resin layer 1 and the second resin layer 2 contains an organic coloring matter X, a metal element Y, a thermoplastic resin and a plasticizer.

It is preferred that both of the first resin layer 1 and the second resin layer 2 contain an organic coloring matter X, a metal element Y, a thermoplastic resin and a plasticizer. In this case, the first resin layer 1 and the second resin layer 2 may be the same as or different from each other. The second resin layer 2 may not contain an organic coloring matter X, may not contain a metal element Y, and may not contain a plasticizer.

In this connection, other layers may be arranged between the first resin layer 1 and the infrared ray reflection layer 3 and between the infrared ray reflection layer 3 and the second resin layer 2, respectively. It is preferred that each of the first resin layer 1 and the second resin layer 2 be directly layered on the infrared ray reflection layer 3. Examples of the other layers include a layer containing a thermoplastic resin such as a polyvinyl acetal resin and a layer containing polyethylene terephthalate and the like.

The first resin layer contains a thermoplastic resin. It is more preferred that the thermoplastic resin in the first resin layer be a polyvinyl acetal resin. It is preferred that the first resin layer contain a plasticizer and it is more preferred that the first resin layer contain a polyvinyl acetal resin and a plasticizer. It is preferred that the first resin layer contain an ultraviolet ray shielding agent and it is preferred that the first resin layer contain an oxidation inhibitor.

The second resin layer contains a thermoplastic resin. It is more preferred that the thermoplastic resin in the second resin layer be a polyvinyl acetal resin. It is preferred that the second resin layer contain a plasticizer and it is more preferred that the second resin layer contain a polyvinyl acetal resin and a plasticizer. It is preferred that the second resin layer contain an ultraviolet ray shielding agent and it is preferred that the second resin layer contain an oxidation inhibitor.

FIG. 2 shows an interlayer film for laminated glass in accordance with one embodiment of the present invention schematically represented as a cross-sectional view.

The interlayer film 11A shown in FIG. 2 is a single-layer interlayer film having a one-layer structure. The interlayer film 11A is used to obtain laminated glass. The interlayer film 11A is an interlayer film for laminated glass.

The interlayer film 11A (first layer) contains an organic coloring matter X, a metal element Y, a thermoplastic resin and a plasticizer.

It is more preferred that the thermoplastic resin in the interlayer film be a polyvinyl acetal resin. It is preferred that the interlayer film contain an ultraviolet ray shielding agent and it is preferred that the interlayer film contain an oxidation inhibitor.

(First Resin Layer and Second Resin Layer)

Hereinafter, the details of each ingredient contained in the interlayer film according to the present invention, and the first resin layer and the second resin layer in the multilayer interlayer film according to the present invention. In the following description, the first resin layer and the second resin layer are sometimes described as the interlayer film.

[Thermoplastic Resin]

Each of the interlayer film, the first resin layer and the second resin layer contains a thermoplastic resin. The thermoplastic resin is not particularly limited. As the thermoplastic resin, a conventionally known thermoplastic resin can be used. One kind of the thermoplastic resin may be used alone, and two or more kinds thereof may be combinedly used.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of the interlayer film to a laminated glass member or another interlayer film is further heightened.

For example, the polyvinyl acetal resin can be produced by acetalizing polyvinyl alcohol with an aldehyde. For example, the polyvinyl alcohol can be produced by saponifying polyvinyl acetate. The saponification degree of the polyvinyl alcohol generally lies within the range of 70 to 99.9% by mole.

The average polymerization degree of the polyvinyl alcohol is preferably greater than or equal to 200, more preferably greater than or equal to 500, preferably less than or equal to 3500, more preferably less than or equal to 3000, and further preferably less than or equal to 2500. When the average polymerization degree is greater than or equal to the above lower limit, the penetration resistance of laminated glass is further enhanced. When the average polymerization degree is less than or equal to the above upper limit, the resin is easily formed into an interlayer film.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin be 3 or 4. When the number of carbon atoms of the acetal group in the polyvinyl acetal resin is greater than or equal to 3, the glass transition temperature of the interlayer film is sufficiently lowered.

The aldehyde is not particularly limited. In general, as the aldehyde, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred. One kind of the aldehyde may be used alone, and two or more kinds thereof may be combinedly used.

The content ratio of the hydroxyl group (the amount of hydroxyl groups) of the polyvinyl acetal resin is preferably greater than or equal to 15% by mole, more preferably greater than or equal to 18% by mole, preferably less than or equal to 40% by mole, and more preferably less than or equal to 35% by mole. When the content ratio of the hydroxyl group is greater than or equal to the above lower limit, the adhesive force of the interlayer film is further heightened. Moreover, when the content ratio of the hydroxyl group is less than or equal to the above upper limit, the flexibility of the interlayer film is enhanced and the handling of the interlayer film is facilitated. The content ratio of the hydroxyl group of the polyvinyl acetal resin is further preferably greater than or equal to 24% by mole, especially preferably greater than or equal to 27% by mole, further preferably less than or equal to 33% by mole, and especially preferably less than or equal to 32% by mole.

The content ratio of the hydroxyl group of the polyvinyl acetal resin is a value expressing the mole fraction determined by dividing the amount of ethylene groups to which the hydroxyl group is bonded by the total amount of ethylene groups in the main chain in terms of percentage. For example, the amount of ethylene groups to which the hydroxyl group is bonded can be measured in accordance with JIS K6726 "Testing methods for polyvinyl alcohol" or in accordance with ASTM D1396-92 to be determined.

The acetylation degree (the amount of acetyl groups) of the polyvinyl acetal resin is preferably greater than or equal to 0.1% by mole, more preferably greater than or equal to 0.3% by mole, further preferably greater than or equal to 0.5% by mole, preferably less than or equal to 30% by mole, more preferably less than or equal to 25% by mole, further preferably less than or equal to 20% by mole, especially preferably less than or equal to 10% by mole, and most preferably less than or equal to 5% by mole. When the acetylation degree is greater than or equal to the above lower limit, the compatibility between the polyvinyl acetal resin and a plasticizer is heightened. When the acetylation degree is less than or equal to the above upper limit, the moisture resistance of the interlayer film and laminated glass is enhanced.

The acetylation degree is a value expressing the mole fraction determined by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain in terms of percentage. For example, the amount of ethylene groups to which the acetal group is bonded can be measured in accordance with JIS K6728 "Testing methods for polyvinyl butyral" or in accordance with ASTM D1396-92.

The acetalization degree of the polyvinyl acetal resin (the butyralization degree in the case of a polyvinyl butyral resin) is preferably greater than or equal to 60% by mole, more preferably greater than or equal to 63% by mole, further preferably greater than or equal to 65% by mole, preferably less than or equal to 85% by mole, more preferably less than or equal to 75% by mole, and further preferably less than or equal to 70% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree is a value expressing the mole fraction determined by dividing the amount of ethylene groups to which the acetal group is bonded by the total amount of ethylene groups in the main chain in terms of percentage.

The acetalization degree can be measured by a method in accordance with JIS K6728 "Testing methods for polyvinyl butyral" or in accordance with ASTM D1396-92.

In this connection, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral". In the case where the polyvinyl acetal resin is a polyvinyl butyral resin, it is preferred that the content ratio of the hydroxyl group (the amount of hydroxyl groups), the acetalization degree (the butyralization degree) and the acetylation degree be calculated from the results measured by a method in accordance with JIS K6778 "Testing methods for polyvinyl butyral".

[Plasticizer]

From the viewpoint of further enhancing the adhesive force of the interlayer film, each of the interlayer film and the first resin layer contains a plasticizer. From the viewpoint of further enhancing the adhesive force of the interlayer film, it is preferred that the second resin layer contain a plasticizer.

The plasticizer is not particularly limited. As the plasticizer, a conventionally known plasticizer can be used. One kind of the plasticizer may be used alone, and two or more kinds thereof may be combinedly used.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

The monobasic organic acid ester is not particularly limited and examples thereof include a glycol ester obtained by the reaction of a glycol with a monobasic organic acid, an ester of triethylene glycol or tripropylene glycol and a monobasic organic acid, and the like. Examples of the glycol include triethylene glycol, tetraethylene glycol, tripropylene glycol and the like. Examples of the monobasic organic acid include butyric acid, isobutyric acid, caproic acid, 2-ethylbutyric acid, hepthylic acid, n-octylic acid, 2-ethylhexanoic acid, n-nonylic acid, decylic acid and the like.

The polybasic organic acid ester is not particularly limited and examples thereof include an ester compound of a polybasic organic acid and an alcohol having a linear or branched structure of 4 to 8 carbon atoms. Examples of the polybasic organic acid include adipic acid, sebacic acid, azelaic acid and the like.

The organic ester plasticizer is not particularly limited and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapryate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyd, a mixture of a phosphoric acid ester and an adipic acid ester, and the like. Organic ester plasticizers other than these may be used.

The organic phosphate plasticizer is not particularly limited and examples thereof include tributoxyethyl phosphate, isodecyl phenyl phosphate, triisopropyl phosphate and the like.

It is preferred that the plasticizer be a diester plasticizer represented by the following formula (1).

[Chemical 1]

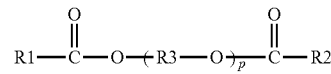

Formula (1)

In the foregoing formula (1), R1 and R2 each represent an organic group with 5 to 10 carbon atoms, R3 represents an ethylene group, an isopropylene group or an n-propylene group, and p represents an integer of 3 to 10. It is preferred that R1 and R2 in the foregoing formula (1) each be an organic group with 6 to 10 carbon atoms.

It is preferred that the plasticizer include at least one kind among triethylene glycol di-2-ethylhexanoate (3GO) and triethylene glycol di-2-ethylbutyrate (3GH), and it is more preferred that the plasticizer include triethylene glycol di-2-ethylhexanoate.

The content of the plasticizer is not particularly limited. In each of the interlayer film, the first resin layer and the second resin layer, relative to 100 parts by weight of the thermoplastic resin, the content of the plasticizer is preferably greater than or equal to 25 parts by weight, more preferably greater than or equal to 30 parts by weight, preferably less than or equal to 60 parts by weight, and more preferably less than or equal to 50 parts by weight. When the content of the plasticizer is greater than or equal to the above lower limit, the penetration resistance of laminated glass is further enhanced. When the content of the plasticizer is less than or equal to the above upper limit, the transparency of the interlayer film is further enhanced.

[Organic Coloring Matter X]

The interlayer film and the first resin layer contain an organic coloring matter X containing a transition element. It is preferred that the second resin layer contain an organic coloring matter X containing a transition element. One kind of the organic coloring matter X may be used alone and two or more kinds thereof may be combinedly used. The transition element contained in the organic coloring matter X may be constituted only of one kind thereof and may be constituted of two or more kinds thereof.

From the viewpoint of further heightening the visible light transmittance and the heat resistance or from the viewpoint of further heightening the visible light transmittance, the heat resistance and the heat shielding properties, it is preferred that the transition element contained in the organic coloring matter X be a group 4 element, a group 5 element, a group 6 element, a group 7 element, a group 8 element, a group 9 element, a group 10 element or a group 11 element, it is more preferred that the transition element be a group 5 element or a group 11 element, it is further preferred that the transition element be copper or vanadium, and it is especially preferred that the transition element be copper. In this case, the organic coloring matter X may contain a plurality of transition elements, may contain a group 5 element and a transition element other than the group 5 element, may contain a group 11 element and a transition element other than the group 11 element, may contain a group 5 element and a group 11 element, and may contain both of copper and vanadium.

Examples of the organic coloring matter X include a phthalocyanine compound containing a transition element, a naphthalocyanine compound containing a transition element, an anthracyanine compound containing a transition element, an indanthrene compound containing a transition element, and the like.

Examples of the phthalocyanine compound include phthalocyanine and a derivative of phthalocyanine. Examples of the naphthalocyanine compound include naphthalocyanine and a derivative of naphthalocyanine. Examples of the anthracyanine compound include anthracyanine and a derivative of anthracyanine. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

It is preferred that the organic coloring matter X be a phthalocyanine compound containing a transition element, a naphthalocyanine compound containing a transition element or an anthracyanine compound containing a transition element. It is more preferred that the organic coloring matter X be a phthalocyanine compound containing a transition element or a naphthalocyanine compound containing a transition element. In this case, both of a phthalocyanine compound and a naphthalocyanine compound may be used. By the use of these preferred organic coloring matters, the visible light transmittance, the heat resistance and the heat shielding properties are further heightened. The organic coloring matter X may be a phthalocyanine compound containing a transition element and may be a naphthalocyanine compound containing a transition element.

From the viewpoint of further heightening the visible light transmittance, the heat resistance and the heat shielding properties, the maximum absorption wavelength of the organic coloring matter X is preferably greater than or equal to 550 nm, preferably less than or equal to 750 nm, more preferably greater than or equal to 600 nm, more preferably less than or equal to 740 nm, further preferably greater than or equal to 650 nm and less than or equal to 730 nm, especially preferably greater than or equal to 700 nm, and especially preferably less than or equal to 720 nm.

The content of the organic coloring matter X in each of the interlayer film, the first resin layer and the second resin layer is not particularly limited. In 100% by weight of each of the interlayer film, the first resin layer and the second resin layer, the content of the organic coloring matter X is preferably greater than or equal to 0.000001% by weight, more preferably greater than or equal to 0.00001% by weight, further preferably greater than or equal to 0.001% by weight, especially preferably greater than or equal to 0.002% by weight, preferably less than or equal to 0.05% by weight, more preferably less than or equal to 0.03% by weight, and further preferably less than or equal to 0.01% by weight. The content of the organic coloring matter X in each of the interlayer film, the first resin layer and the second resin layer is preferably greater than or equal to 0.0005 parts by weight, more preferably greater than or equal to 0.001 parts by weight, further preferably greater than or equal to 0.0014 parts by weight, especially preferably greater than or equal to 0.002 parts by weight, preferably less than or equal to 0.03 parts by weight, more preferably less than or equal to 0.02 parts by weight, and further preferably less than or equal to 0.01 parts by weight. When the content of the organic coloring matter X in the interlayer film is greater than or equal to the above lower limit and less than or equal to the above upper limit, effects of the above-mentioned 1), 2) and 3) are further satisfactorily obtained. Moreover, with regard to the color tone, it is possible to attain a color tone which is preferable as that of laminated glass.

[Metal Element Y]

The interlayer film and the first resin layer contain a metal element Y. It is preferred that the second resin layer contain a metal element Y. In the case where the interlayer film, the first resin layer or the second resin layer contains metal oxide particles, the metal element Y is also different from a metal element contained in the metal oxide particles having heat shielding performance. This means that the metal element Y does not constitute apart of the metal oxide particle having heat shielding performance. In the interlayer film according to the present invention, the metal element Y is not contained as a part of the metal oxide particle having heat shielding performance. Furthermore, the metal element Y is different from the transition element. Accordingly, the metal element Y is different from a transition element contained in an organic coloring matter X. One kind of the metal element Y may be used alone and two or more kinds thereof may be combinedly used.

It is preferred that the metal element Y be added as an alkali metal salt or an alkaline earth metal salt (hereinafter, sometimes described as a metal salt M) to be contained in the interlayer film. In this case, both of the alkali metal salt and the alkaline earth metal salt may be used. By the use of the metal salt M, controlling the adhesivity between a laminated glass member and the interlayer film or the adhesivity between respective layers in the interlayer film is facilitated. One kind of the metal salt M may be used alone and two or more kinds thereof may be combinedly used. In this connection, examples of an alkaline earth metal include magnesium and beryllium.

It is preferred that each of the interlayer film and the metal salt M contain Li, Na, K, Rb, Cs, Mg, Ca, Sr or Ba. It is preferred that each of the interlayer film and the metal salt M contain K (potassium) or Mg (magnesium). In this case, both of K and Mg may be contained. It is preferred that each of the interlayer film and the metal salt M contain K, and it is also preferred that each of the interlayer film and the metal salt M contain Mg.

Moreover, it is preferred that the metal salt M be an alkali metal salt of an organic acid with 1 to 16 carbon atoms or an alkaline earth metal salt of an organic acid with 1 to 16 carbon atoms, and it is more preferred that the metal salt M be a magnesium salt of a carboxylic acid with 1 to 16 carbon atoms or a potassium salt of a carboxylic acid with 1 to 16 carbon atoms. It is further preferred that the metal salt M be an alkali metal salt of an organic acid with 2 to 16 carbon atoms or an alkaline earth metal salt of an organic acid with 2 to 16 carbon atoms, and it is especially preferred that the metal salt M be a magnesium salt of a carboxylic acid with 2 to 16 carbon atoms or a potassium salt of a carboxylic acid with 2 to 16 carbon atoms.

Although the magnesium salt of a carboxylic acid with 1 to 16 carbon atoms and the potassium salt of a carboxylic acid with 1 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like. It is preferred that the magnesium salt of a carboxylic acid with 1 to 16 carbon atoms be a magnesium salt of a carboxylic acid with 2 to 10 carbon atoms, it is more preferred that the magnesium salt be a magnesium salt of a carboxylic acid with 2 to 8 carbon atoms, and it is further preferred that the magnesium salt be a magnesium salt of a carboxylic acid with 2 to 6 carbon atoms. It is preferred that the potassium salt of a carboxylic acid with 1 to 16 carbon atoms be a potassium salt of a carboxylic acid with 2 to 10 carbon atoms, it is more preferred that the potassium salt be a potassium salt of a carboxylic acid with 2 to 8 carbon atoms, and it is further preferred that the potassium salt be a potassium salt of a carboxylic acid with 2 to 6 carbon atoms.

From the viewpoint of further effectively obtaining the effects of the above-mentioned 1), 2) and 3), in each of the interlayer film, the first resin layer and the second resin layer, it is preferred that the metal element Y be added as potassium acetate, magnesium acetate or magnesium 2-ethylbutyrate to be contained. Accordingly, it is preferred that each of the interlayer film, the first resin layer and the second resin layer contain potassium acetate, magnesium acetate or magnesium 2-ethylbutyrate. It is more preferred that each of the interlayer film, the first resin layer and the second resin layer contain magnesium acetate or magnesium 2-ethylbutyrate, only one among magnesium acetate and magnesium 2-ethylbutyrate may be used, and both of magnesium acetate and magnesium 2-ethylbutyrate may be used. Each of the interlayer film, the first resin layer and the second resin layer may contain magnesium acetate and magnesium 2-ethylbutyrate, may contain magnesium acetate and potassium acetate, and may contain magnesium 2-ethylbutyrate and potassium acetate.

The content of the metal element Y in the interlayer film is preferably greater than or equal to 5 ppm, more preferably greater than or equal to 10 ppm, further preferably greater than or equal to 20 ppm, preferably less than or equal to 300 ppm, more preferably less than or equal to 250 ppm, and further preferably less than or equal to 200 ppm. In the case where the interlayer film contains an alkali metal as the metal element, the content of the alkali metal in the interlayer film is preferably greater than or equal to 5 ppm, more preferably greater than or equal to 10 ppm, further preferably greater than or equal to 20 ppm, preferably less than or equal to 300 ppm, more preferably less than or equal to 250 ppm, and further preferably less than or equal to 200 ppm. In the case where the interlayer film contains an alkaline earth metal as the metal element, the content of the alkaline earth metal in the interlayer film is preferably greater than or equal to 5 ppm, more preferably greater than or equal to 10 ppm, further preferably greater than or equal to 20 ppm, preferably less than or equal to 300 ppm, more preferably less than or equal to 250 ppm, and further preferably less than or equal to 200 ppm. In the case where the interlayer film contains an alkali metal and an alkaline earth metal as the metal element, the total content of the alkali metal and the alkaline earth metal in the interlayer film is preferably greater than or equal to 5 ppm, more preferably greater than or equal to 10 ppm, further preferably greater than or equal to 20 ppm, preferably less than or equal to 300 ppm, more preferably less than or equal to 250 ppm, and further preferably less than or equal to 200 ppm. When the content of the metal element Y is greater than or equal to the above lower limit and less than or equal to the above upper limit, the adhesivity between a laminated glass member and the interlayer film or the adhesivity between respective layers in the interlayer film can be further well controlled. Furthermore, when the content of the metal element Y is greater than or equal to the above lower limit, the light resistance of the interlayer film is still further enhanced, and high visible light transmittance can be maintained over a further longer period of time. The content of the metal element Y in the interlayer film can be measured by means of a high frequency inductively coupled plasma emission spectrometer ("ICPE-9000" available from SHIMADZU CORPORATION) or the like.

From the viewpoint of further effectively obtaining the effects of the above-mentioned 1), 2) and 3), the content of the metal element Y relative to 1 part by weight of the organic coloring matter X is preferably greater than or equal to 0.5 parts by weight, more preferably greater than or equal to 1 part by weight, further preferably greater than or equal to 2 parts by weight, preferably less than or equal to 48 parts by weight, more preferably less than or equal to 24 parts by weight, and further preferably less than or equal to 16 parts by weight. When the content of the metal element Y relative to 100 parts by weight of the organic coloring matter X is greater than or equal to the above lower limit and less than or equal to the above upper limit, the adhesivity between a laminated glass member and the interlayer film or the adhesivity between respective layers in the interlayer film can be further well controlled, the light resistance of the interlayer film is still further enhanced, and high visible light transmittance can be maintained over a further longer period of time.

[Ultraviolet Ray Shielding Agent]

It is preferred that the interlayer film contain an ultraviolet ray shielding agent. It is preferred that the first resin layer contain an ultraviolet ray shielding agent. It is preferred that the second resin layer contain an ultraviolet ray shielding agent. By the use of an ultraviolet ray shielding agent, even when the interlayer film and the laminated glass are used for a long period of time, the visible light transmittance becomes further difficult to be lowered. One kind of the ultraviolet ray shielding agent may be used alone and two or more kinds thereof may be combinedly used.

Examples of the ultraviolet ray shielding agent include an ultraviolet ray absorber. It is preferred that the ultraviolet ray shielding agent be an ultraviolet ray absorber.

Examples of the ultraviolet ray shielding agent include a metal-based ultraviolet ray shielding agent, a metal oxide-based ultraviolet ray shielding agent, a benzotriazole ultraviolet ray shielding agent, a benzophenone ultraviolet ray shielding agent, a triazine ultraviolet ray shielding agent, a malonic acid ester ultraviolet ray shielding agent, an oxanilide ultraviolet ray shielding agent, a benzoate ultraviolet ray shielding agent, and the like. In this connection, the benzotriazole ultraviolet ray shielding agent is an ultraviolet ray shielding agent having a benzotriazole structure, the benzophenone ultraviolet ray shielding agent is an ultraviolet ray shielding agent having a benzophenone structure, the triazine ultraviolet ray shielding agent is an ultraviolet ray shielding agent having a triazine structure, the malonic acid ester ultraviolet ray shielding agent is an ultraviolet ray shielding agent having a malonic acid ester structure, the oxanilide ultraviolet ray shielding agent is an ultraviolet ray shielding agent having an oxanilide structure, and the benzoate ultraviolet ray shielding agent is an ultraviolet ray shielding agent having a benzoate structure.

Examples of the metal-based ultraviolet ray shielding agent include platinum particles, particles in which the surface of platinum particles is coated with silica, palladium particles, particles in which the surface of palladium particles is coated with silica, and the like. It is preferred that the ultraviolet ray shielding agent not be heat shielding particles.

The ultraviolet ray shielding agent is preferably a benzotriazole ultraviolet ray shielding agent, a benzophenone ultraviolet ray shielding agent, a triazine ultraviolet ray shielding agent or a benzoate ultraviolet ray shielding agent, more preferably a benzotriazole ultraviolet ray shielding agent or a benzophenone ultraviolet ray shielding agent, and further preferably a benzotriazole ultraviolet ray shielding agent.

Examples of the metal oxide-based ultraviolet ray shielding agent include zinc oxide, titanium oxide, cerium oxide and the like. Furthermore, in the metal oxide-based ultraviolet ray shielding agent, the surface thereof may be coated. Examples of a coating material for the surface of the metal oxide-based ultraviolet ray shielding agent include an insulating metal oxide, a hydrolyzable organosilicon compound, a silicone compound and the like.

Examples of the insulating metal oxide include silica, alumina, zirconia and the like. For example, the insulating metal oxide has a band-gap energy greater than or equal to 5.0 eV.

Examples of the benzotriazole ultraviolet ray shielding agent include benzotriazole ultraviolet ray shielding agents such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the ultraviolet ray shielding agent be a benzotriazole ultraviolet ray shielding agent containing halogen atoms, and it is more preferred that the ultraviolet ray shielding agent be a benzotriazole ultraviolet ray shielding agent containing chlorine atoms, since those are excellent in ultraviolet ray absorbing performance.

Examples of the benzophenone ultraviolet ray shielding agent include octabenzone ("Chimassorb 81" available from BASF Japan Ltd.) and the like.

Examples of the triazine ultraviolet ray shielding agent include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.) and the like.

Examples of the malonic acid ester ultraviolet ray shielding agent include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate and the like.

Examples of a commercial product of the malonic acid ester ultraviolet ray shielding agent include Hostavin B-CAP, Hostavin PR-25 and Hostavin PR-31 (any of these is available from Clariant Japan K.K.).

Examples of the anilide oxalate ultraviolet ray shielding agent include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxy-phenyl)oxalic acid diamide and 2-ethyl-2'-ethoxy-oxyanilide ("Sanduvor VSU" available from Clariant Japan K.K.).

Examples of the benzoate ultraviolet ray shielding agent include 2,4-di-tert-butylphenyl-3,5-di-tert-butyl-4-hydroxybenzoate ("Tinuvin 120" available from BASF Japan Ltd.) and the like.

From the viewpoint of further suppressing the lowering in visible light transmittance after the lapse of a certain period of time, the content of the ultraviolet ray shielding agent is preferably greater than or equal to 0.1% by weight, more preferably greater than or equal to 0.2% by weight, further preferably greater than or equal to 0.3% by weight, especially preferably greater than or equal to 0.5% by weight, preferably less than or equal to 2.5% by weight, more preferably less than or equal to 2% by weight, further preferably less than or equal to 1% by weight, and especially preferably less than or equal to 0.8% by weight, in 100% by weight of each of the interlayer film, the first resin layer and the second resin layer. In particular, by allowing the content of the ultraviolet ray shielding agent to be greater than or equal to 0.2% by weight, the lowering in visible light transmittance of the interlayer film and laminated glass after the lapse of a certain period of time can be significantly suppressed.

[Oxidation Inhibitor]

It is preferred that the interlayer film contain an oxidation inhibitor. It is preferred that the first resin layer contain an oxidation inhibitor. It is preferred that the second resin layer contain an oxidation inhibitor. One kind of the oxidation inhibitor may be used alone and two or more kinds thereof may be combinedly used.

Examples of the oxidation inhibitor include a phenol oxidation inhibitor, a sulfur oxidation inhibitor, a phosphorus oxidation inhibitor and the like. The phenol oxidation inhibitor is an oxidation inhibitor having a phenol skeleton. The sulfur oxidation inhibitor is an oxidation inhibitor containing a sulfur atom. The phosphorus oxidation inhibitor is an oxidation inhibitor containing a phosphorus atom.

It is preferred that the oxidation inhibitor be a phenol oxidation inhibitor or a phosphorus oxidation inhibitor.

Examples of the phenol oxidation inhibitor include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus oxidation inhibitor include tridecyl phosphite, tris(tridecyl)phosphite, triphenyl phosphite, trinonylphenyl phosphite, bis(tridecyl)pentaerithritol diphosphite, bis(decyl)pentaerithritol diphosphite, tris(2,4-di-t-butylphenyl)phosphite, bis(2,4-di-t-butyl-6-methylphenyl)ethyl ester phosphorous acid, tris(2,4-di-t-butylphenyl) phosphite, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "Smilizer BHT" available from Sumitomo Chemical Co., Ltd., "Irganox 1010" available from Nihon Ciba-Geigy K.K., and the like.

In order to maintain high visible light transmittance of the interlayer film and laminated glass over a long period of time, it is preferred that the content of the oxidation inhibitor be greater than or equal to 0.1% by weight in 100% by weight of each of the interlayer film, the first resin layer and the second resin layer. Moreover, since an effect commensurate with the addition of an oxidation inhibitor is not attained, it is preferred that the content of the oxidation inhibitor be less than or equal to 2% by weight in 100% by weight of each of the interlayer film, the first resin layer and the second resin layer.

From the viewpoint of further heightening the visible light transmittance of the interlayer film and laminated glass and the visible light transmittance of the interlayer film and laminated glass after the lapse of a certain period of time, the content of the oxidation inhibitor is preferably greater than or equal to 0.1% by weight in 100% by weight of each of the interlayer film, the first resin layer and the second resin layer. Moreover, in order to suppress the discoloration of the peripheral part due to the influence of the oxidation inhibitor, the content of the oxidation inhibitor is preferably less than or equal to 2% by weight, and more preferably less than or equal to 1.8% by weight, in 100% by weight of each of the interlayer film, the first resin layer and the second resin layer.

[Heat Shielding Particles]

It is preferred that the interlayer film contain heat shielding particles. It is preferred that the first resin layer contain the heat shielding particles. It is preferred that the second resin layer contain the heat shielding particles. By the use of the heat shielding particles, infrared rays (heat rays) can be effectively cut off One kind of the heat shielding particles may be used alone and two or more kinds thereof may be combinedly used.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength greater than or equal to 780 nm which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Of these, since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

The tungsten oxide particles are generally represented by the following formula (X1) or the following formula (X2). In the interlayer film, the tungsten oxide particles represented by the following formula (X1) or the following formula (X2) are suitably used.

$$W_yO_z \quad \text{Formula (X1)}$$

In the foregoing formula (X1), W represents tungsten, O represents oxygen, and y and z satisfy the equation of $2.0<z/y<3.0$.

$$M_xW_yO_z \quad \text{Formula (X2)}$$

In the foregoing formula (X2), M represents at least one kind of the element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta and Re, W represents tungsten, O represents oxygen, and x, y and z satisfy the equations of $0.001 \leq x/y \leq 1$ and $2.0<z/y\leq 3.0$.

From the viewpoint of further heightening the heat shielding properties of the interlayer film and laminated glass, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

From the viewpoint of further heightening the heat shielding properties of the interlayer film and laminated glass, cesium-doped tungsten oxide particles are especially preferred. From the viewpoint of still further heightening the heat shielding properties of the interlayer film and laminated glass, it is preferred that the cesium-doped tungsten oxide particles be tungsten oxide particles represented by the formula: $Cs_{0.33}WO_3$.

The average particle diameter of the heat shielding particles is preferably greater than or equal to 0.01 µm, more preferably greater than or equal to 0.02 µm, preferably less than or equal to 0.1 µm, and more preferably less than or equal to 0.05 µm. When the average particle diameter is greater than or equal to the above lower limit, the heat ray shielding properties are sufficiently heightened. When the average particle diameter is less than or equal to the above upper limit, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of each of the interlayer film, the first resin layer and the second resin layer, the content of the heat shielding particles is preferably greater than or equal to 0.01% by weight, more preferably greater than or equal to 0.1% by weight, further preferably greater than or equal to 1% by weight, especially preferably greater than or equal to 1.5% by weight, preferably less than or equal to 6% by weight, more preferably less than or equal to 5.5% by weight, further preferably less than or equal to 4% by weight, especially preferably less than or equal to 3.5% by weight, and most preferably less than or equal to 3% by weight. When the content of the heat shielding particles is greater than or equal to the above lower limit and less than or equal to the above upper limit, the heat shielding properties are sufficiently heightened and the visible light transmittance is sufficiently heightened.

It is preferred that each of the interlayer film, the first resin layer and the second resin layer contain the heat shielding particles in a proportion greater than or equal to 0.1 $g/m^2$ and less than or equal to 12 $g/m^2$. In the case where the proportion of the heat shielding particles lies within the above-mentioned range, the heat shielding properties are sufficiently heightened and the visible light transmittance is sufficiently heightened. The proportion of the heat shielding particles is preferably greater than or equal to 0.5 g/m$^2$, more preferably greater than or equal to 0.8 g/m$^2$, further preferably greater than or equal to 1.5 g/m$^2$, especially preferably greater than or equal to 3 g/m$^2$, preferably less than or equal to 11 g/m$^2$, more preferably less than or equal to 10 g/m$^2$, further preferably less than or equal to 9 g/m$^2$, and especially preferably less than or equal to 7 g/m$^2$. When the proportion is greater than or equal to the above lower limit, the heat shielding properties are further heightened. When the proportion is less than or equal to the above upper limit, the visible light transmittance is further heightened.

[Other Ingredients]

Each of the interlayer film, the first resin layer and the second resin layer may contain additives such as a light stabilizer, a flame retardant, an antistatic agent, a pigment, a dye, an adhesive force regulating agent, a moisture-resistance improving agent, a fluorescent brightening agent and an infrared ray absorber, as necessary. One kind of these additives may be used alone, and two or more kinds thereof may be combinedly used.

(Infrared Ray Reflection Layer)

The infrared ray reflection layer reflects infrared rays. The infrared ray reflection layer is not particularly limited as long as the layer has infrared ray reflecting performance. Examples of the infrared ray reflection layer include a resin film with metal foil, a multilayer laminated film in which a metal layer and a dielectric layer are formed on a resin layer, a film containing graphite, a multilayer resin film, a liquid crystal film, and the like. These films have infrared ray reflecting performance.

The infrared ray reflection layer reflects infrared rays. The infrared ray reflection layer is not particularly limited as long as the layer has infrared ray reflecting performance. It is preferred that the infrared ray reflection layer has a characteristic having the infrared ray transmittance of 50% or less at one or more wavelength within the range of 780 to 2100 nm., since the layer is excellent in infrared ray reflecting performance. In at least one wavelength within the range of 780 to 2100 nm, the infrared ray transmittance is more preferably less than or equal to 30%. In this connection, the infrared ray transmittance of an infrared ray reflection layer used in the example described below satisfies the above-mentioned preferred condition. Moreover, it is preferred that the infrared ray reflection layer be capable of reflecting light rays in the range of 800 to 1300 nm.

Examples of the infrared ray reflection layer include a resin film with metal foil, a multilayer laminated film in which a metal layer and a dielectric layer are formed on a resin layer, a film containing graphite, a multilayer resin film, a liquid crystal film, and the like. These films have infrared ray reflecting performance.

The resin film with metal foil is provided with a resin film and metal foil layered on the outer surface of the resin film. Examples of the material for the resin film include a polyethylene terephthalate resin, a polyvinyl acetal resin, an ethylene-vinyl acetate copolymer resin, an ethylene-acryl copolymer resin, a polyurethane resin, a polyvinyl alcohol resin, a polyolefin resin, a polyvinyl chloride resin, a polyimide resin and the like. Examples of the material for the metal foil include aluminum, copper, silver, gold, palladium, an alloy containing these metals, and the like.

The resin film with metal foil is provided with a resin film and metal foil layered on the outer surface of the resin film. Examples of the material for the resin film include a polyethylene terephthalate resin, a polyvinyl acetal resin, an ethylene-vinyl acetate copolymer resin, an ethylene-acryl copolymer resin, a polyurethane resin, a polyvinyl alcohol resin, a polyolefin resin, a polyvinyl chloride resin, a polyimide resin and the like. Examples of the material for the metal foil include aluminum, copper, silver, gold, palladium, an alloy containing these metals, and the like.

The multilayer laminated film in which a metal layer and a dielectric layer are formed on a resin layer is a multilayer laminated film in which metal layers and dielectric layers are alternately layered in an arbitrary number of layers on a resin layer (resin film).

Examples of the material for the resin layer (resin film) in the multilayer laminated film include the same material as the material for the resin film in the resin film with metal foil. Examples of the material for the resin layer (resin film) in the multilayer laminated film include polyethylene, polypropylene, polylactic acid, poly(4-methylpentene-1), polyvinylidene fluoride, cyclic polyolefin, polymethyl methacrylate, polyvinyl chloride, polyvinyl alcohol, a polyamide such as nylon 6, 11, 12 and 66, polystyrene, polycarbonate, polyester, polyphenylene sulfide, polyetherimide and the like. Examples of the material for the metal layer in the multilayer laminated film include the same material as the material for the metal foil in the resin film with metal foil. On both sides or on one side of the metal layer, a coat layer of a metal or a mixed oxide may be provided. Examples of the material for the coat layer include ZnO, Al$_2$O$_3$, Ga$_2$O$_3$, InO$_3$, MgO, Ti, NiCr, Cu and the like.

Examples of the material for the dielectric layer in the multilayer laminated film include indium oxide and the like.

The multilayer resin film is a laminated film in which plural resin films are layered. Examples of the material for the multilayer resin film include the same material as the material for the resin layer (resin film) in the multilayer laminated film. The number of laminations of resin films in the multilayer resin film is greater than or equal to 2, may be greater than or equal to 3, and may be greater than or equal to 5. The number of laminations of resin films in the multilayer resin film may be less than or equal to 1000, may be less than or equal to 100, and may be less than or equal to 50.

The multilayer resin film may be a multilayer resin film in which two or more kinds of thermoplastic resin layers having a different optical property (refractive index) are alternately or randomly layered in an arbitrary number of layers. Such a multilayer resin film is constituted so that desired infrared ray reflecting performance is attained. For example, the multilayer resin film is prepared by alternately layering plural resin layers X and plural resin layers Y having a refractive index higher than the resin layer X, and respective resin layers X may be different from one another in thickness and respective resin layers Y may also be different from one another in thickness. Since the multilayer resin film is prepared by alternately or randomly layering two or more kinds of thermoplastic resin layers having a different optical property (refractive index) in an arbitrary number of layers, there is a problem that a reflection spectrum of the incident light in a direction inclined from the normal line direction of the surface of the multilayer resin film is shifted to the short wavelength side as compared with a reflection spectrum of the incident light in the normal line direction of the surface of the multilayer resin film. This means that a reflection spectrum of the incident light in a direction inclined from the normal line direction is shifted to the visible range even in the case where a reflection spectrum of the incident light in the normal line direction of the surface of the multilayer resin film does not exist in the visible range. In the case where the reflection spectrum is shifted to the visible range, it follows that an observer positioned in a direction inclined from the normal line direction of the surface of the multilayer resin film visually recognizes reflected light which gives a feeling of discomfort. However, in the case where the interlayer film for laminated glass according to the present invention is layered on the multilayer resin film, excellent actions and effects such that reflected light which gives a feeling of discomfort is alleviated are exerted and it is possible to obtain laminated glass which is satisfactory in hue. It is preferred that the multilayer resin film contain polyethylene terephthalate or polyethylene naphthalate.

Examples of the liquid crystal film include a film prepared by layering cholesteric liquid crystal layers which reflect light with an arbitrary wavelength in an arbitrary number of layers. Such a liquid crystal film is constituted so that desired infrared ray reflecting performance is attained.

It is preferred that the infrared ray transmittance in the wavelength range of 780 to 2100 nm of the first resin layer be higher than the infrared ray transmittance in the wavelength range of 780 to 2100 nm of the second resin layer. Considering from a different point of view, it is preferred that the infrared ray absorptance of the first resin layer be lower than the infrared ray absorptance of the second resin layer.

Laminated glass prepared with an interlayer film has hitherto been sometimes low in heat shielding properties. Furthermore, with regard to the conventional laminated glass, there is a problem that achieving both high heat shielding properties and high visible light transmittance (Visible Transmittance) at the same time is difficult.

In contrast, in the case where the multilayer interlayer film is provided with the infrared ray reflection layer, and furthermore, first and second resin layers are arranged on both sides of the infrared ray reflection layer and the infrared ray transmittance of the first resin layer is higher than the infrared ray transmittance of the second resin layer, it is possible to effectively heighten the heat shielding properties of laminated glass prepared with the multilayer interlayer film. Furthermore, it is possible to effectively heighten the visible light transmittance of laminated glass prepared with the multilayer interlayer film. In such laminated glass prepared with the multilayer interlayer film, it is possible to heighten the heat shielding properties, and furthermore, it is possible to obtain the laminated glass which is high in visible light transmittance.

In the case where the infrared ray transmittance in the wavelength range of 780 to 2100 nm of the first resin layer is higher than the infrared ray transmittance in the wavelength range of 780 to 2100 nm of the second resin layer, the first resin layer transmits a relatively large quantity of infrared rays. As such, most of the infrared rays transmitted through the first resin layer reach the infrared ray reflection layer. Since the infrared ray reflection layer reflects infrared rays, infrared rays which have reached the infrared ray reflection layer are reflected by the infrared ray reflection layer. Moreover, because the infrared ray transmittance of the first resin layer is high, most of the infrared rays reflected by the infrared ray reflection layer are transmitted through the first resin layer. As a result, a rise in the temperature of a multilayer interlayer film at the time when infrared rays are made incident into the multilayer interlayer film can be suppressed. As such, the heat shielding properties of the multilayer interlayer film are heightened, and furthermore, high visible light transmittance can be maintained over a long period of time since the film is excellent in light resistance. Moreover, by mounting laminated glass prepared with the multilayer interlayer film on an opening part of a building or a vehicle, a rise in the temperature of an inner space of a building or a vehicle can be effectively suppressed.

On the other hand, if the first resin layer and the infrared ray reflection layer transmit a part of infrared rays at all, the transmitted infrared rays reach the second resin layer. In the case where the infrared ray transmittance in the wavelength range of 780 to 2100 nm of the first resin layer is higher than the infrared ray transmittance in the wavelength range of 780 to 2100 nm of the second resin layer, the second resin layer effectively cuts off the transmission of infrared rays since the infrared ray transmittance of the second resin layer is relatively low. As such, the quantity of heat rays passing through the whole multilayer interlayer film can be reduced. This also enables the heat shielding properties of the multilayer interlayer film to be heightened, and by mounting laminated glass prepared with the multilayer interlayer film on an opening part of a building or a vehicle, a rise in the temperature of an inner space of a building or a vehicle can be effectively suppressed.

Moreover, as a result of allowing the quantity of infrared rays which reach the second resin layer to be reduced, the deterioration of the second resin layer can be suppressed and the light resistance of the whole multilayer interlayer film is enhanced. As such, high visible light transmittance can be maintained over a long period of time. Furthermore, in the case where the second resin layer contains a heat shielding compound such as heat shielding particles, the deterioration of the heat shielding compound can also be suppressed and high heat shielding properties can be maintained over a long period of time.

In the case where the infrared ray transmittance in the wavelength range of 780 to 2100 nm of the first resin layer is higher than the infrared ray transmittance in the wavelength range of 780 to 2100 nm of the second resin layer, it is preferred that the first resin layer and the second resin layer be different from each other in composition. In this connection, even when the first resin layer and the second resin layer are the same as each other in composition, by making the thickness of the first resin layer thinner than the thickness of the second resin layer, it is possible to make the infrared ray transmittance in the wavelength range of 780 to 2100 nm of the first resin layer higher than the infrared ray transmittance in the wavelength range of 780 to 2100 nm of the second resin layer.

(Interlayer Film for Laminated Glass and Multilayer Interlayer Film for Laminated Glass)

The thickness of the interlayer film according to the present invention is not particularly limited. From the viewpoint of the practical aspect and the viewpoint of sufficiently heightening the heat shielding properties, the thickness of the interlayer film is preferably greater than or equal to 0.1 mm, more preferably greater than or equal to 0.25 mm, preferably less than or equal to 3 mm, and more preferably less than or equal to 1.5 mm. When the thickness of the interlayer film is greater than or equal to the above lower limit, the penetration resistance of laminated glass is enhanced.

The thickness of the multilayer interlayer film according to the present invention is not particularly limited. From the viewpoint of the practical aspect and the viewpoint of sufficiently heightening the heat shielding properties, the thickness of the multilayer interlayer film is preferably greater than or equal to 0.1 mm, more preferably greater than or equal to 0.25 mm, preferably less than or equal to 3 mm, and more preferably less than or equal to 1.5 mm. When the thickness of the multilayer interlayer film is greater than or equal to the above lower limit, the penetration resistance of laminated glass is enhanced.

The production methods of the interlayer film according to the present invention and the multilayer interlayer film according to the present invention are not particularly limited. As the production methods of the interlayer film and the multilayer interlayer film, conventionally known methods can be used. Examples thereof include a production method of kneading an organic coloring matter X, a metal element Y, a thermoplastic resin, a plasticizer and other ingredients blended as necessary to obtain a kneaded product and forming the kneaded product into an interlayer film or a multilayer interlayer film. A production method of extrusion-molding is preferred because the method is suitable for continuous production.

The method for kneading is not particularly limited. Examples of this method include a method using an extruder, a plastograph, a kneader, a banbury mixer, a calender roll, or the like. In order to obtain the multilayer interlayer film according to the present invention, a first resin layer, an infrared ray reflection layer and a second resin layer are separately prepared, after which the first resin layer, the infrared ray reflection layer and the second resin layer may be layered to obtain an interlayer film, and a first resin layer, an infrared ray reflection layer and a second resin layer may be layered by coextrusion to obtain an interlayer film.

It is preferred that the first resin layer and the second resin layer contain the same thermoplastic resin as each other, and it is more preferred that the first resin layer and the second resin layer contain the same thermoplastic resin as each other and the same plasticizer as each other, since the interlayer films or the multilayer interlayer films are excellent in production efficiency. The first layer and the second resin layer may be formed from the same resin composition as each other.

(Laminated Glass)

FIG. 3 is a cross-sectional view schematically showing an example of laminated glass prepared with the interlayer film for laminated glass shown in FIG. 1.

The laminated glass 31 shown in FIG. 3 is provided with a first laminated glass member 21, a second laminated glass member 22 and a multilayer interlayer film 11. The multilayer interlayer film 11 is arranged between the first laminated glass member 21 and the second laminated glass member 22 to be sandwiched.

The first laminated glass member 21 is layered on a first surface 11a of the multilayer interlayer film 11. The second laminated glass member 22 is layered on a second surface 11b opposite to the first surface 11a of the multilayer interlayer film 11. The first laminated glass member 21 is layered on an outer surface 1a of the first resin layer 1. The second laminated glass member 22 is layered on an outer surface 2a of the second resin layer 2.

FIG. 4 is a cross-sectional view schematically showing an example of laminated glass prepared with the interlayer film for laminated glass shown in FIG. 2.

The laminated glass 31A shown in FIG. 4 is provided with a first laminated glass member 21, a second laminated glass member 22 and an interlayer film 11A. The interlayer film 11A is arranged between the first laminated glass member 21 and the second laminated glass member 22 to be sandwiched.

As described above, the laminated glass according to the present invention is provided with the first laminated glass member, the second laminated glass member and the interlayer film according to the present invention or the multilayer interlayer film according to the present invention, and the interlayer film or the multilayer interlayer film is arranged between the first laminated glass member and the second laminated glass member. The laminated glass includes at least the interlayer film according to the present invention.

Examples of the laminated glass member include a glass plate and a PET (polyethylene terephthalate) film and the like. As the laminated glass, laminated glass in which an interlayer film is sandwiched between a glass plate and a PET film or the like, as well as laminated glass in which an interlayer film is sandwiched between two glass plates, is included. Laminated glass is a laminate provided with a glass plate, and it is preferred that at least one glass plate be used. It is preferred that the first laminated glass member and the second laminated glass member be each a glass plate or a PET film and at least one among the first glass member and the second laminated glass member be a glass plate.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, net-reinforced plate glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thickness of the laminated glass member is preferably greater than or equal to 1 mm, preferably less than or equal to 5 mm, and more preferably less than or equal to 3 mm. Moreover, in the case where the laminated glass member is a glass plate, the thickness of the glass plate is preferably greater than or equal to 1 mm, preferably less than or equal to 5 mm, and more preferably less than or equal to 3 mm. In the case where the laminated glass member is a PET film, the thickness of the PET film is preferably greater than or equal to 0.03 mm and preferably less than or equal to 0.5 mm.

The production method of the laminated glass is not particularly limited. For example, the interlayer film or the multilayer interlayer film is sandwiched between the first laminated glass member and the second laminated glass member and the air remaining between the first laminated glass member and the interlayer film or the multilayer interlayer film and between the second laminated glass member and the interlayer film or the multilayer interlayer film is removed by allowing the members to pass through a pressing roll or by putting the members into a rubber bag and allowing the contents to be sucked under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The interlayer film, the multilayer interlayer film and the laminated glass can be used for automobiles, railway vehicles, aircraft, ships, buildings and the like. The interlayer film, the multilayer interlayer film and the laminated glass can also be used for applications other than these applications. It is preferred that the interlayer film, the multilayer interlayer film and the laminated glass be an interlayer film, a multilayer interlayer film and laminated glass for vehicles or for construction, and it is more preferred that the interlayer film, the multilayer interlayer film and the laminated glass be an interlayer film, a multilayer interlayer film and laminated glass for vehicles. The interlayer film, the multilayer interlayer film and the laminated glass can be used for a windshield, side glass, rear glass or roof glass of an automobile and the like. The interlayer film, the multilayer interlayer film and the laminated glass are suitably used especially for a windshield.

(Method of Mounting Laminated Glass)

The method of mounting laminated glass prepared with the multilayer interlayer film according to the present invention is a method of mounting the above-described laminated glass for a building or a vehicle on an opening part between an outer space and an inner space into which heat rays are made incident from the outer space.

Specifically, the laminated glass is mounted on the opening part so that the first laminated glass member is positioned at the outer space side and the second laminated glass member is positioned at the inner space side. That is, the laminated glass is mounted so that an arrangement order of the outer space/a first laminated glass member/(another layer/) a first resin layer/(another layer/) an infrared ray reflection layer/(another layer/) a second resin layer/(another layer/) a second laminated glass member/the inner space is attained. Preferably, it is preferred that an arrangement order of the outer space/a first laminated glass member/a first resin layer/(another layer/) an infrared ray reflection layer/(another layer/) a second resin layer/a second laminated glass member/the inner space be attained, it is preferred that an arrangement order of the outer space/a first laminated glass member/(another layer/) a first resin layer/an infrared ray reflection layer/a second resin layer/(another layer/) a second laminated glass member/the inner space be attained, and it is preferred that an arrangement order of the outer space/a first laminated glass member/a first resin layer/an infrared ray reflection layer/a second resin layer/a second laminated glass member/the inner space be attained. In the above-mentioned arrangement forms, the case where another member is arranged between the outer space and the first laminated glass member is included, and the case where another member is arranged between the inner space and the second laminated glass member is included.

In the layered structure, each of another layer mentioned above and another member mentioned above may be present or may be absent. Sunlight containing heat rays is made incident into laminated glass from an outer space, and the sunlight containing heat rays, which has passed through the laminated glass, is led to an inner space. In the case where laminated glass is mounted on an opening part as mentioned above, the outer surface of the first laminated glass member constitutes the incident face for heat rays. Moreover, heat rays are made incident into the first resin layer earlier than the second resin layer.

Hereinafter, the present invention will be described in more detail with reference to examples. The present invention is not limited only to these examples.

The following materials were used for an interlayer film, a first resin layer and a second resin layer.

Thermoplastic Resin:

PVB1 (a polyvinyl butyral resin acetalized with n-butyraldehyde, the average polymerization degree of 1700, the content ratio of the hydroxyl group of 30.8% by mole, the acetylation degree of 0.7% by mole, the butyralization degree of 68.5% by mole)

PVB2 (a polyvinyl butyral resin acetalized with n-butyraldehyde, the average polymerization degree of 1700, the content ratio of the hydroxyl group of 30.5% by mole, the acetylation degree of 1% by mole, the butyralization degree of 68.5% by mole)

In this connection, the content ratio of the hydroxyl group, the acetylation degree and the butyralization degree (the acetalization degree) of the polyvinyl butyral resin were measured by a method in accordance with ASTM D1396-92. In this connection, even in the cases of being measured according to JIS K6728 "Testing methods for polyvinyl butyral", numerical values similar to those obtained by a method in accordance with ASTM D1396-92 were exhibited.

Plasticizer:

3GO (triethylene glycol di-2-ethylhexanoate)

Organic coloring matter X containing transition element:

SG-5A1257 (a phthalocyanine compound, "BLUE SG-5A1257" available from SUMIKA COLOR CO., LTD. which contains a copper atom as the central metal, the maximum absorption wavelength of 715 nm, an absorption wavelength peak is also observed at a wavelength of 620 nm)

Ingredient Containing Metal Element Y:

Mg salt (a mixture of Mg salts containing 50% by weight of magnesium acetate and 50% by weight of magnesium 2-ethylbutyrate)

K salt (potassium acetate)

Heat Shielding Particles:

ITO (ITO particles, tin-doped indium oxide particles)

CWO (CWO particles, cesium-doped tungsten oxide ($Cs_{0.33}WO_3$) particles)

Ultraviolet Ray Shielding Agent:

T-326 (2-(2'-hydroxy-3'-t-butyl-5-methylphenyl)-5-chlorobenzotriazole, "Tinuvin 326" available from BASF Japan Ltd.)

Oxidation Inhibitor:

H-BHT (2,6-di-t-butyl-4-methyl-methylphenol, "H-BHT" available from Sakai Chemical Industry Co., Ltd.)

BHT (2,6-di-t-butyl-p-cresol)

The following infrared ray reflection layer was used for a multilayer interlayer film.

Nano 80S (a multilayer film (a multilayer resin film), "Multilayer Nano 80S" available from 3M Japan Limited)

In this connection, "Nano 80S" contains polyethylene terephthalate and allows the infrared ray transmittance to be less than or equal to 50% in at least one wavelength within the range of 780 to 2100 nm. Moreover, "Nano 80S" reflects light rays in the range of 800 to 1300 nm.

Moreover, the following material was used for laminated glass.

Clear (clear glass (transparent float clear glass), 30 cm in longitudinal length by 30 cm in transversal length by 2.5 mm in thickness)

Example 1

Preparation of Interlayer Film

With 40 parts by weight of a plasticizer (3GO), 0.0055 parts by weight of an organic coloring matter X (SG-5A1257) and a compound (an Mg salt) containing a metal element Y in an amount that the Mg content in the resulting interlayer film becomes 160 ppm were mixed to obtain a plasticizer dispersion.

To 100 parts by weight of a thermoplastic resin (PVB2), the whole amount of the plasticizer dispersion obtained, 0.8 parts by weight of an ultraviolet ray shielding agent (T-326) and 0.2 parts by weight of an oxidation inhibitor (BHT) were added and thoroughly kneaded with a mixing roll to obtain a composition.

The composition obtained was extruded by an extruder to obtain an interlayer film (0.76 mm in thickness).

Preparation of Laminated Glass:

The interlayer film obtained was cut into a size of 30 cm in longitudinal length by 30 cm in transversal length. The interlayer film obtained (0.76 mm in thickness) was sandwiched between two sheets of clear glass (30 cm in longitudinal length by 30 cm in transversal length by 2.5 mm in thickness), held in place for 30 minutes at 90° C. and pressed under vacuum with a vacuum laminator to obtain a laminate. With regard to the laminate obtained, interlayer film portions protruded from the sheet of clear glass were cut away to obtain a sheet of laminated glass.

Example 2 and Comparative Examples 1, 2

An interlayer film and a sheet of laminated glass were obtained in the same manner as that in Example 1 except that the kind of ingredients to be blended in the interlayer film and the blending amount thereof were set to those listed in the following Table 1. In this connection, the CWO was added at the time of obtaining a plasticizer dispersion. The kind and the blending amount of an ultraviolet ray shielding agent and an oxidation inhibitor are the same as those in Example 1.

Example 3

Preparation of Interlayer Film

To 100 parts by weight of a thermoplastic resin (PVB1), 40 parts by weight of a plasticizer (3GO), 0.0028 parts by weight (the content of the organic coloring matter itself) of an organic coloring matter X (SG-5A1257), a compound (a mixture of Mg salts) containing a metal element Y in an amount that the Mg content in the resulting interlayer film becomes 160 ppm, 0.2 parts by weight of an ultraviolet ray shielding agent (T-326) and 0.2 parts by weight of an oxidation inhibitor (H-BHT) were added and thoroughly kneaded with a mixing roll to obtain a composition.

The composition obtained was extruded by an extruder to obtain an interlayer film (0.76 mm in thickness).

The interlayer film obtained was cut into a size of 30 cm in longitudinal length by 30 cm in transversal length. The interlayer film obtained (0.76 mm in thickness) was interposed between two sheets of clear glass (2.5 mm in thickness) and fixed by means of a heat resistant tape so as not to positionally shift to obtain a laminate.

The laminate obtained was installed in a vacuum bag, and the inside of the vacuum bag was degassed at a degree of vacuum of 933.2 hPa and at ordinary temperature (23° C.). Subsequently, the temperature in the vacuum bag was elevated to 100° C. while maintaining the degassed state, and after the temperature reached 100° C., the laminate was held for 20 minutes. Afterward, the vacuum bag was allowed to spontaneously cool, and it was confirmed that the temperature was lowered to 30° C., after which the pressure was released to the atmosphere.

The laminated glass preliminarily press-bonded by the above-mentioned vacuum bag method was press-bonded for 20 minutes under conditions of 135° C. and a pressure of 1.2 MPa using an autoclave to obtain a sheet of laminated glass.

Examples 4, 5, 10 to 21

An interlayer film and a sheet of laminated glass were obtained in the same manner as that in Example 3 except that the kind of ingredients to be blended in the interlayer film and the blending amount thereof were set to those listed in the following Table 3. In this connection, the kind and the blending amount of an ultraviolet ray shielding agent and an oxidation inhibitor are the same as those in Example 3.

Example 6

Preparation of First Resin Layer (Interlayer Film)

With 40 parts by weight of a plasticizer (3GO), 0.007 parts by weight (the content of the organic coloring matter itself) of an organic coloring matter X (SG-5A1257) and a compound (an Mg salt) containing a metal element Y in an amount that the Mg content in the resulting interlayer film becomes 160 ppm were mixed to obtain a plasticizer dispersion.

To 100 parts by weight of a thermoplastic resin (PVB2), the whole amount of the plasticizer dispersion obtained, 0.8 parts by weight of an ultraviolet ray shielding agent (T-326) and 0.2 parts by weight of an oxidation inhibitor (BHT) were added and thoroughly kneaded with a mixing roll to obtain a first composition.

The first composition obtained was extruded by an extruder to obtain a first resin layer (0.38 mm in thickness).

Preparation of Second Resin Layer (Interlayer Film):

With 40 parts by weight of a plasticizer (3GO), 0.4 parts by weight of heat shielding particles (ITO) and a compound (an Mg salt) containing a metal element Y in an amount that the Mg content in the resulting interlayer film becomes 160 ppm were mixed to obtain a plasticizer dispersion.

To 100 parts by weight of a thermoplastic resin (PVB2), the whole amount of the plasticizer dispersion obtained, 0.8 parts by weight of an ultraviolet ray shielding agent (T-326) and 0.2 parts by weight of an oxidation inhibitor (BHT) were added and thoroughly kneaded with a mixing roll to obtain a second composition.

The composition obtained was extruded by an extruder to obtain a second resin layer (0.38 mm in thickness).

Preparation of Multilayer Interlayer Film:

The Nano 80S (a multilayer film (a multilayer resin film), "Multilayer Nano 80S" available from 3M Japan Limited) as an infrared ray reflection layer was prepared. The thickness was determined to be 76 μm.

The above-mentioned infrared ray reflection layer was sandwiched between the first resin layer obtained and the second resin layer obtained to obtain a multilayer interlayer film.

Preparation of Laminated Glass:

The multilayer interlayer film obtained was cut into a size of 30 cm in longitudinal length by 30 cm in transversal length. The multilayer interlayer film obtained was sandwiched between two sheets of clear glass (30 cm in longitudinal length by 30 cm in transversal length by 2.5 mm in thickness), held in place for 30 minutes at 90° C. and pressed under vacuum with a vacuum laminator to obtain a laminate. With regard to the laminate obtained, multilayer interlayer film portions protruded from the sheet of clear glass were cut away to obtain a sheet of laminated glass.

Examples 7 to 9, 22 to 33

A multilayer interlayer film and a sheet of laminated glass were obtained in the same manner as that in Example 6 except that the kind of ingredients to be blended in the first resin layer and the second resin layer and the blending amount thereof were set to those listed in the following Table 5. In this connection, the kind and the blending amount of an ultraviolet ray shielding agent and an oxidation inhibitor are the same as those in Example 6.

(Evaluation)

(1) Measurement Method of Maximum Absorption Wavelength of Organic Coloring Matter With 100 parts by weight of chloroform, 0.002 parts by weight (the content of the organic coloring matter itself) of an organic coloring matter was mixed to obtain a chloroform solution. The chloroform solution obtained was placed in a quartz cell for a spectrophotometer with an optical path length of 1.0 mm. Using a self-registering spectrophotometer ("U-4100" available from Hitachi, Ltd.), the transmittance at 300 to 2500 nm was measured to determine the maximum absorption wavelength. The measured values are described in the column of the above-mentioned materials.

(2) Visible Light Transmittance of Laminated Glass (A Light Y Value, Initial A-Y (380 to 780 nm))

The laminated glass was measured for the transmittance in the wavelength range of 300 to 2500 nm using a spectrophotometer ("U-4100" available from Hitachi, Ltd.) to calculate the visible light transmittance at 380 to 780 nm in accordance with JIS R3211 (1998).

(3) Measurement of Tts (Total Solar Transmittance)

The laminated glass was measured for the transmittance and the reflectance in the wavelength range of 300 to 2500 nm using a spectrophotometer ("U-4100" available from Hitachi, Ltd.) to measure the Tts in accordance with ISO 13837.

(4) Initial YI Value of Laminated Glass

The transmittance in the wavelength range of 380 to 2500 nm was measured using a spectrophotometer ("U4100" available from Hitachi, Ltd.) to calculate the initial YI value (the yellowness index, the yellow index) in accordance with JIS K7373.

(5) Heat Resistance

The laminated glass was held in place for 8 weeks under a condition of 100° C. using a forced convection type constant-temperature thermostatic apparatus ("DKM300" available from Yamato Scientific Co., Ltd.). The laminated glass obtained at the end of 8 weeks was measured for the YI value in the same manner as that for the above-mentioned (4) YI value of laminated glass. The $\Delta$YI value ((YI value after held at 100° C.)−(initial YI value)) was determined.

(6) Hue

A sheet of laminated glass having a layered structure with a stack of glass/a first resin layer/an infrared ray reflection layer (a multilayer resin film)/a second resin layer/glass was held in place so as to be parallel to the horizontal direction. Next, the laminated glass was visually observed from a point A which is in the normal line direction of the glass surface of the laminated glass and is apart from the center part of the glass surface of the laminated glass by 50 cm. The laminated glass was arranged so that the first resin layer side of the laminated glass can be observed from the point A.

Next, while maintaining the distance from the center part of the glass surface of the laminated glass to an observer constant, the observer was allowed to move from the point A to a point in the same plane as the glass surface of the laminated glass in order to observe the laminated glass for the hue. The hue was evaluated according to the following criteria.

[Criteria for Judgment in Hue]

◯◯: Ten persons observe the laminated glass for the hue, whereupon eight or more persons cannot recognize the change in hue.

◯: Ten persons observe the laminated glass for the hue, whereupon five to seven persons cannot recognize the change in hue.

x: The laminated glass does not satisfy the criteria for judgment of ◯◯ or ◯.

In this connection, in the case where an infrared ray reflection layer (a multilayer resin film) is observed alone in the same manner, although the hue cannot be observed at the point A, all ten persons can recognize the change in hue (red color) when the persons are allowed to move from the point A to a point in the same plane as the glass surface of the laminated glass in order to observe the laminated glass.

The details and the results are shown in the following Tables 1 to 6. In this connection, the evaluation results of Example 2 are excellent as in the case of Example 1. Moreover, even in the case where magnesium acetate and potassium acetate are combinedly used as the metal elements, the effects similar to those in Examples 1 to 33 are obtained.

TABLE 1

| | Composition of interlayer film | | | | | | | | | |
|---|---|---|---|---|---|---|---|---|---|---|
| | Thermoplastic resin | | Plasticizer | | Organic coloring matter | | Ingredient containing metal element | | Heat shielding particles | |
| First laminated glass member | Kind | Blending amount Parts by weight | Kind | Blending amount Parts by weight | Kind | Blending amount Parts by weight | Kind | Blending amount ppm | Kind | Blending amount Parts by weight | Second laminated glass member |
| Ex. 1 | Clear | PVB2 | 100 | 3GO | 40 | SG-5A1257 | 0.0055 | Mg salt | 160 | — | — | Clear |
| Ex. 2 | Clear | PVB2 | 100 | 3GO | 40 | SG-5A1257 | 0.0055 | Mg salt | 160 | CWO | 0.08 | Clear |
| Comp. Ex. 1 | Clear | PVB2 | 100 | 3GO | 40 | SG-5A1257 | 0.0055 | — | — | — | — | Clear |
| Comp. Ex. 2 | Clear | PVB2 | 100 | 3GO | 40 | SG-5A1257 | 0.0055 | | 160 | CWO | 0.08 | Clear |

TABLE 2

| | Measurement results | | | |
|---|---|---|---|---|
| | Visible light transmittance A-Y (%) | Tts (%) | Initial YI value | Heat resistance Δ YI value |
| Ex. 1 | 72.3 | 75.9 | −26.0 | 0.3 |
| Ex. 2 | 67.8 | 59.6 | −24.8 | 3.0 |
| Comp. Ex. 1 | 72.5 | 76.0 | −26.3 | 1.4 |
| Comp. Ex. 2 | 68.9 | 61.4 | −25.9 | 4.6 |

TABLE 3

| | Composition of interlayer film | | | | | | | | | |
|---|---|---|---|---|---|---|---|---|---|---|
| | Thermoplastic resin | | Plasticizer | | Organic coloring matter | | Ingredient containing metal element | | Heat shielding particles | |
| First laminated glass member | Kind | Blending amount Parts by weight | Kind | Blending amount Parts by weight | Kind | Blending amount Parts by weight | Kind | Blending amount ppm | Kind | Blending amount Parts by weight | Second laminated glass member |
| Ex. 3 | Clear | PVB1 | 100 | 3GO | 40 | SG-5A1257 | 0.0028 | Mg salt | 160 | — | — | Clear |
| Ex. 4 | Clear | PVB1 | 100 | 3GO | 40 | SG-5A1257 | 0.0056 | Mg salt | 160 | — | — | Clear |
| Ex. 5 | Clear | PVB1 | 100 | 3GO | 40 | SG-5A1257 | 0.0014 | Mg salt | 160 | — | — | Clear |
| Ex. 10 | Clear | PVB1 | 100 | 3GO | 40 | SG-5A1257 | 0.0028 | Mg salt | 20 | — | — | Clear |
| Ex. 11 | Clear | PVB1 | 100 | 3GO | 40 | SG-5A1257 | 0.0028 | Mg salt | 240 | — | — | Clear |
| Ex. 12 | Clear | PVB1 | 100 | 3GO | 40 | SG-5A1257 | 0.0056 | Mg salt | 20 | — | — | Clear |
| Ex. 13 | Clear | PVB1 | 100 | 3GO | 40 | SG-5A1257 | 0.0056 | Mg salt | 240 | — | — | Clear |
| Ex. 14 | Clear | PVB1 | 100 | 3GO | 40 | SG-5A1257 | 0.0014 | Mg salt | 20 | — | — | Clear |
| Ex. 15 | Clear | PVB1 | 100 | 3GO | 40 | SG-5A1257 | 0.0014 | Mg salt | 240 | — | — | Clear |
| Ex. 16 | Clear | PVB1 | 100 | 3GO | 40 | SG-5A1257 | 0.0028 | K salt | 20 | — | — | Clear |
| Ex. 17 | Clear | PVB1 | 100 | 3GO | 40 | SG-5A1257 | 0.0028 | K salt | 240 | — | — | Clear |
| Ex. 18 | Clear | PVB1 | 100 | 3GO | 40 | SG-5A1257 | 0.0056 | K salt | 20 | — | — | Clear |
| Ex. 19 | Clear | PVB1 | 100 | 3GO | 40 | SG-5A1257 | 0.0056 | K salt | 240 | — | — | Clear |
| Ex. 20 | Clear | PVB1 | 100 | 3GO | 40 | SG-5A1257 | 0.0014 | K salt | 20 | — | — | Clear |
| Ex. 21 | Clear | PVB1 | 100 | 3GO | 40 | SG-5A1257 | 0.0014 | K salt | 240 | — | — | Clear |

TABLE 4

| | Measurement results | | | |
|---|---|---|---|---|
| | Visible light transmittance A-Y (%) | Tts (%) | Initial YI value | Heat resistance Δ YI value |
| Ex. 3 | 79.8 | 78.0 | −13.0 | 0.1 |
| Ex. 4 | 72.2 | 75.8 | −26.7 | 0.4 |
| Ex. 5 | 84.1 | 79.3 | −6.0 | 0.1 |
| Ex. 10 | 79.4 | 77.8 | −12.7 | 0.5 |
| Ex. 11 | 79.5 | 77.8 | −12.5 | 0.3 |
| Ex. 12 | 71.5 | 75.4 | −26.1 | 1.0 |
| Ex. 13 | 71.5 | 75.5 | −25.6 | 0.7 |
| Ex. 14 | 83.9 | 79.1 | −5.9 | 0.2 |
| Ex. 15 | 83.9 | 79.2 | −5.8 | 0.2 |
| Ex. 16 | 79.2 | 77.7 | −12.2 | −0.1 |
| Ex. 17 | 79.3 | 77.8 | −12.0 | −0.1 |

TABLE 4-continued

| | Measurement results | | | |
|---|---|---|---|---|
| | Visible light transmittance A-Y (%) | Tts (%) | Initial YI value | Heat resistance Δ YI value |
| Ex. 18 | 71.1 | 75.3 | −25.1 | −0.1 |
| Ex. 19 | 71.2 | 75.3 | −24.9 | −0.1 |
| Ex. 20 | 83.8 | 79.1 | −5.7 | −0.0 |
| Ex. 21 | 83.9 | 76.2 | −5.5 | −0.0 |

TABLE 5

| | | Composition of first resin layer | | | | | | | | |
|---|---|---|---|---|---|---|---|---|---|---|
| | | Thermoplastic resin | | Plasticizer | | Organic coloring matter | | Ingredient containing metal element | | Heat shielding particles | |
| | First laminated glass member | Kind | Blending amount Parts by weight | Kind | Blending amount Parts by weight | Kind | Blending amount Parts by weight | Kind | Blending amount ppm | Kind | Blending amount Parts by weight |
| Ex. 6 | Clear | PVB2 | 100 | 3GO | 40 | SG-5A1257 | 0.007 | Mg salt | 160 | — | — |
| Ex. 7 | Clear | PVB2 | 100 | 3GO | 40 | SG-5A1257 | 0.010 | Mg salt | 320 | — | — |
| Ex. 8 | Clear | PVB2 | 100 | 3GO | 40 | SG-5A1257 | 0.004 | Mg salt | 320 | — | — |
| Ex. 9 | Clear | PVB2 | 100 | 3GO | 40 | SG-5A1257 | 0.006 | Mg salt | 320 | — | — |
| Ex. 22 | Clear | PVB1 | 100 | 3GO | 40 | SG-5A1257 | 0.0028 | Mg salt | 20 | — | — |
| Ex. 23 | Clear | PVB1 | 100 | 3GO | 40 | SG-5A1257 | 0.0028 | Mg salt | 480 | — | — |
| Ex. 24 | Clear | PVB1 | 100 | 3GO | 40 | SG-5A1257 | 0.0056 | Mg salt | 20 | — | — |
| Ex. 25 | Clear | PVB1 | 100 | 3GO | 40 | SG-5A1257 | 0.0056 | Mg salt | 480 | — | — |
| Ex. 26 | Clear | PVB1 | 100 | 3GO | 40 | SG-5A1257 | 0.0014 | Mg salt | 20 | — | — |
| Ex. 27 | Clear | PVB1 | 100 | 3GO | 40 | SG-5A1257 | 0.0014 | Mg salt | 480 | — | — |
| Ex. 28 | Clear | PVB1 | 100 | 3GO | 40 | SG-5A1257 | 0.0028 | K salt | 20 | — | — |
| Ex. 29 | Clear | PVB1 | 100 | 3GO | 40 | SG-5A1257 | 0.0028 | K salt | 480 | — | — |
| Ex. 30 | Clear | PVB1 | 100 | 3GO | 40 | SG-5A1257 | 0.0056 | K salt | 20 | — | — |
| Ex. 31 | Clear | PVB1 | 100 | 3GO | 40 | SG-5A1257 | 0.0056 | K salt | 480 | — | — |
| Ex. 32 | Clear | PVB1 | 100 | 3GO | 40 | SG-5A1257 | 0.0014 | K salt | 20 | — | — |
| Ex. 33 | Clear | PVB1 | 100 | 3GO | 40 | SG-5A1257 | 0.0014 | K salt | 480 | — | — |

| | Composition of second resin layer | | | | | | | | |
|---|---|---|---|---|---|---|---|---|---|
| | Thermoplastic resin | | Plasticizer | | Ingredient containing metal element | | Heat shielding particles | | |
| | Infrared ray reflection layer | Kind | Blending amount Parts by weight | Kind | Blending amount Parts by weight | Kind | Blending amount ppm | Kind | Blending amount Parts by weight | Second laminated glass member |
| Ex. 6 | Nano 80S | PVB2 | 100 | 3GO | 40 | Mg salt | 160 | ITO | 0.4 | Clear |
| Ex. 7 | Nano 80S | PVB2 | 100 | 3GO | 40 | Mg salt | 320 | ITO | 0.4 | Clear |
| Ex. 8 | Nano 80S | PVB2 | 100 | 3GO | 40 | Mg salt | 320 | CWO | 0.08 | Clear |
| Ex. 9 | Nano 80S | PVB2 | 100 | 3GO | 40 | Mg salt | 320 | CWO | 0.08 | Clear |
| Ex. 22 | Nano 80S | PVB2 | 100 | 3GO | 40 | Mg salt | 160 | ITO | 0.4 | Clear |
| Ex. 23 | Nano 80S | PVB2 | 100 | 3GO | 40 | Mg salt | 320 | ITO | 0.4 | Clear |
| Ex. 24 | Nano 80S | PVB2 | 100 | 3GO | 40 | Mg salt | 320 | CWO | 0.08 | Clear |
| Ex. 25 | Nano 80S | PVB2 | 100 | 3GO | 40 | Mg salt | 320 | CWO | 0.08 | Clear |
| Ex. 26 | Nano 80S | PVB2 | 100 | 3GO | 40 | Mg salt | 320 | CWO | 0.08 | Clear |
| Ex. 27 | Nano 80S | PVB2 | 100 | 3GO | 40 | Mg salt | 320 | CWO | 0.08 | Clear |
| Ex. 28 | Nano 80S | PVB2 | 100 | 3GO | 40 | Mg salt | 160 | ITO | 0.4 | Clear |
| Ex. 29 | Nano 80S | PVB2 | 100 | 3GO | 40 | Mg salt | 320 | ITO | 0.4 | Clear |
| Ex. 30 | Nano 80S | PVB2 | 100 | 3GO | 40 | Mg salt | 320 | CWO | 0.08 | Clear |
| Ex. 31 | Nano 80S | PVB2 | 100 | 3GO | 40 | Mg salt | 320 | CWO | 0.08 | Clear |
| Ex. 32 | Nano 80S | PVB2 | 100 | 3GO | 40 | Mg salt | 320 | CWO | 0.08 | Clear |
| Ex. 33 | Nano 80S | PVB2 | 100 | 3GO | 40 | Mg salt | 320 | CWO | 0.08 | Clear |

TABLE 6

| | Measurement results | | | | |
|---|---|---|---|---|---|
| | Visible light transmittance A-Y (%) | Tts (%) | Initial YI value | Heat resistance Δ YI value | Hue |
| Ex. 6 | 74.5 | 58.2 | −33.5 | 0.5 | ○○ |
| Ex. 7 | 70.8 | 57.0 | −46.7 | 0.9 | ○○ |
| Ex. 8 | 75.0 | 57.3 | −19.9 | 0.3 | ○○ |
| Ex. 9 | 73.0 | 56.7 | −26.7 | 0.4 | ○○ |
| Ex. 22 | 82.8 | 69.1 | −5.0 | 1.2 | ○ |
| Ex. 23 | 82.9 | 69.2 | −4.9 | 1.1 | ○ |
| Ex. 24 | 74.5 | 59.0 | −9.5 | 1.3 | ○○ |
| Ex. 25 | 74.5 | 59.1 | −9.3 | 1.1 | ○○ |
| Ex. 26 | 80.9 | 61.0 | 0.6 | 0.9 | ○ |
| Ex. 27 | 81.0 | 61.0 | 0.7 | 0.9 | ○ |
| Ex. 28 | 82.7 | 69.1 | −4.7 | 0.9 | ○ |
| Ex. 29 | 82.8 | 69.1 | −4.7 | 0.9 | ○ |
| Ex. 30 | 74.3 | 59.0 | −9.0 | 0.8 | ○○ |
| Ex. 31 | 74.4 | 59.0 | −8.9 | 0.8 | ○○ |
| Ex. 32 | 80.9 | 61.0 | 0.8 | 0.8 | ○ |
| Ex. 33 | 81.0 | 61.0 | 0.9 | 0.8 | ○ |

EXPLANATION OF SYMBOLS

1: First resin layer
1a: Outer surface
2: Second resin layer
2a: Outer surface
3: Infrared ray reflection layer
3a: First surface
3b: Second surface
11: Multilayer interlayer film
11A: Interlayer film (single layer)
11a: First surface
11b: Second surface
21: First laminated glass member
22: Second laminated glass member
31: Laminated glass
31A: Laminated glass

The invention claimed is:

1. A multilayer interlayer film for laminated glass, comprising an infrared ray reflection layer reflecting infrared rays, a first resin layer containing a thermoplastic resin, and a second resin layer containing a thermoplastic resin,
wherein the first resin layer is arranged on a first surface side of the infrared ray reflection layer,
the second resin layer is arranged on a second surface side opposite to the first surface side of the infrared ray reflection layer, and
at least the first resin layer among the first resin layer and the second resin layer is an interlayer film for laminated glass which contains an organic coloring matter containing a transition element, a metal element different from a transition element, the thermoplastic resin, a plasticizer, and metal oxide particles,
the transition element in the organic coloring matter containing a transition element is copper or vanadium, and
the organic coloring matter containing a transition element is a phthalocyanine compound or a naphthalocyanine compound, and
wherein the organic coloring matter and the metal oxide particles are dispersed throughout an entirety of the thickness of the first resin layer.

2. The multilayer interlayer film for laminated glass according to claim 1,
wherein the metal element is a polyvalent metal element.

3. The multilayer interlayer film for laminated glass according to claim 1,
wherein the content of the metal element is greater than or equal to 20 ppm and less than or equal to 200 ppm in the interlayer film for laminated glass.

4. The multilayer interlayer film for laminated glass according to claim 1,
wherein the metal element different from the transition element is magnesium, and the metal element different from the transition element is added as magnesium acetate or magnesium 2-ethylbutyrate to be contained in the interlayer film for laminated glass.

5. The multilayer interlayer film for laminated glass according to claim 1,
wherein the maximum absorption wavelength of the organic coloring matter containing a transition element is greater than or equal to 550 nm and less than or equal to 750 nm.

6. The multilayer interlayer film for laminated glass according to claim 1,
wherein the metal oxide particles are tin-doped indium oxide particles or tungsten oxide particles.

7. The multilayer interlayer film for laminated glass according to claim 1,
wherein the thermoplastic resin contained in the interlayer film for laminated glass is a polyvinyl acetal resin.

8. The multilayer interlayer film for laminated glass according to claim 1,
wherein the infrared ray reflection layer has a characteristic having, the infrared ray transmittance of 50% or less at one or more wavelength within the range of 780 to 2100 mm.

9. The multilayer interlayer film for laminated glass according to claim 1,
wherein the infrared ray reflection layer is a resin film with metal foil, a multilayer laminated film in which a metal layer and a dielectric layer are formed on a resin layer, a multilayer resin film or a liquid crystal film.

10. The multilayer interlayer film for laminated glass according to claim 1,
wherein the first resin layer contains an ultraviolet ray shielding agent.

11. The multilayer interlayer film for laminated glass according to claim 10, wherein the ultraviolet ray shielding agent is a metal oxide-based ultraviolet ray shielding agent that is coated with an insulating metal oxide, the insulating metal oxide comprising zirconia.

12. The multilayer interlayer film for laminated glass according to claim 1,
wherein the infrared ray transmittance in the wavelength range of 780 to 2100 nm of the first resin layer is higher than the infrared ray transmittance in the wavelength range of 780 to 2100 nm of the second resin layer.

13. The multilayer interlayer film for laminated glass according to claim 1,
wherein the thermoplastic resin contained in the second resin layer is a polyvinyl acetal resin.

14. The multilayer interlayer film for laminated glass according to claim 1,
wherein the second resin layer contains a plasticizer.

15. The multilayer interlayer film for laminated glass according to claim 1,
wherein the first resin layer contains an ultraviolet ray shielding agent and the second resin layer contains an ultraviolet ray shielding agent.

16. Laminated glass, comprising a first laminated glass member, a second laminated glass member and a multilayer interlayer film for laminated glass according to claim 1, wherein the multilayer interlayer film for laminated glass is arranged between the first laminated glass member and the second laminated glass member.

17. The multilayer interlayer film for laminated glass according to claim 1, further comprising a layer containing polyethylene terephthalate, the layer containing polyethylene terephthalate being arranged between the first resin layer and the infrared ray reflection layer, or between the infrared ray reflection layer and the second resin layer.

* * * * *